United States Patent
Haratani et al.

(10) Patent No.: US 8,326,222 B2
(45) Date of Patent: Dec. 4, 2012

(54) NON-CONTACT SIGNAL TRANSMISSION DEVICE HAVING A MAGNETORESISTIVE ELEMENT FOR COMMUNICATING BETWEEN MUTUALLY INSULATED ELECTRICAL CIRCUITS

(75) Inventors: Susumu Haratani, Tokyo (JP); Hitoshi Yamaguchi, Tokyo (JP); Masahiro Miyazaki, Tokyo (JP); Yoshio Sase, Tokyo (JP); Shigeru Shimura, Tokyo (JP)

(73) Assignee: TDK Corporation, Tokyo (JP)

( * ) Notice: Subject to any disclaimer, the term of this patent is extended or adjusted under 35 U.S.C. 154(b) by 382 days.

(21) Appl. No.: 12/659,795

(22) Filed: Mar. 22, 2010

(65) Prior Publication Data
US 2010/0248623 A1 Sep. 30, 2010

(30) Foreign Application Priority Data
Mar. 26, 2009 (JP) ................................. 2009-077121

(51) Int. Cl.
*H04B 5/00* (2006.01)
*G02B 27/00* (2006.01)
(52) U.S. Cl. ...................................... 455/41.1; 250/551
(58) Field of Classification Search .................. 455/41.1; 250/551
See application file for complete search history.

(56) References Cited

U.S. PATENT DOCUMENTS

| | | | |
|---|---|---|---|
| 5,831,426 A * | 11/1998 | Black et al. | 324/127 |
| 6,300,617 B1 * | 10/2001 | Daughton et al. | 250/214.1 |
| 6,429,992 B1 * | 8/2002 | Ozue et al. | 360/66 |
| 7,733,082 B2 * | 6/2010 | Abou | 324/207.15 |
| 2003/0132826 A1 * | 7/2003 | Wan | 338/32 R |
| 2006/0061350 A1 * | 3/2006 | Myers et al. | 324/117 R |
| 2009/0121819 A1 * | 5/2009 | Haratani et al. | 336/221 |
| 2010/0283458 A1 * | 11/2010 | Doogue et al. | 324/252 |

FOREIGN PATENT DOCUMENTS

| | | |
|---|---|---|
| JP | A-2003-526083 | 9/2003 |
| WO | WO 99/45405 | 9/1999 |

\* cited by examiner

*Primary Examiner* — Temesghen Ghebretinsae
*Assistant Examiner* — Devan Sandiford
(74) *Attorney, Agent, or Firm* — Oliff & Berridge, PLC

(57) ABSTRACT

A signal transmission device includes: an input signal conductor in which an input signal current flows and thereby generating an input signal magnetic field; a magnetically-biasing conductor in which a biasing current flows and thereby generating a biasing magnetic field; and one or more magnetoresistive elements in each of which a sensing current flows and thereby generating a self-biasing magnetic field, and each including a magnetization free layer having a magnetization direction which varies in response to the input signal magnetic field, the biasing magnetic field, and the self-biasing magnetic field. Each of the biasing magnetic field and the self-biasing magnetic field is applied to the magnetization free layer in a same direction to each other.

11 Claims, 16 Drawing Sheets

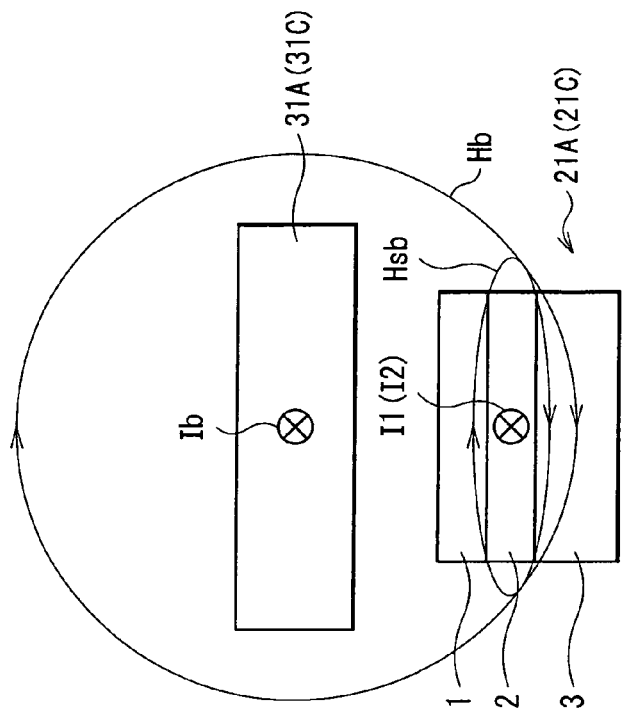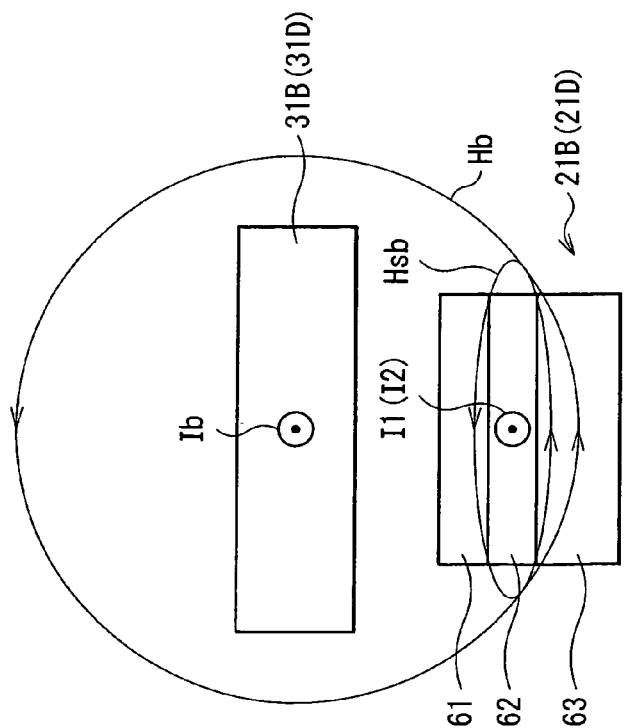
FIG. 6B
FIG. 6A

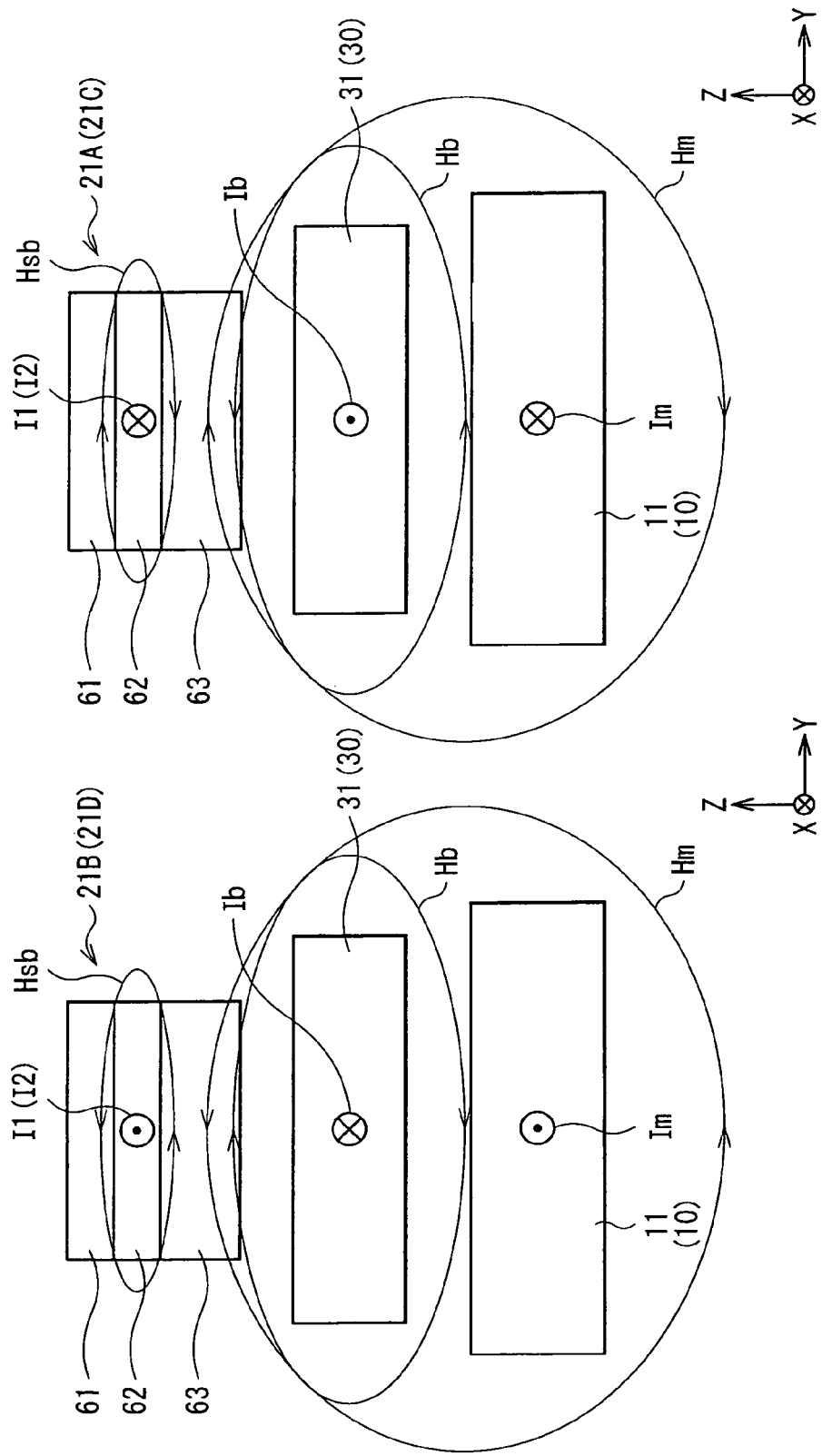

NON-CONTACT SIGNAL TRANSMISSION DEVICE HAVING A MAGNETORESISTIVE ELEMENT FOR COMMUNICATING BETWEEN MUTUALLY INSULATED ELECTRICAL CIRCUITS

BACKGROUND OF THE INVENTION

1. Field of the Invention

The present invention relates to a signal transmission device which performs signal transmission between a plurality of mutually-insulated electric circuits in a non-contact fashion by utilizing a magnetoresistive element.

2. Description of the Related Art

A photocoupler, a pulse transformer and so forth are known as devices for transmitting, in a non-contact fashion, a signal from one electric circuit to another electric circuit in a plurality of electric circuits which are insulated one another. However, a temporal change such as exhaustion and degradation of a light-emitting diode (LED) or decrease in a current-transmission rate, is significant in the photocoupler, and a delay in the signal transmission is large as well. The pulse transformer has a small delay in the signal transmission, although it has several issues in that a shape and weight are large, and an operable temperature is low. There is also known a coupler in which a winding coil of a pulse transformer is replaced by a thin-film coil, although such a coupler is also disadvantageous in that the coil for receiving a magnetic field is inferior in efficiency, and thus power consumption is large.

To address these issues, Published Japanese Translation of PCT Application No. 2003-526083 (JP2003-526083A) discloses a signal transmission device provided with a magnetoresistive element. This signal transmission device detects a change in a current, supplied from one electric circuitry system and flowing in a signal conducting line, in a non-contact fashion with the magnetoresistive element (i.e., the current change is detected in a state in which the signal conducting line is insulated), and transmits the current change to the other electric circuitry system as an electric signal. Such a signal transmission device is drawing attention as having superior operation reliability yet having a simplified structure.

SUMMARY OF THE INVENTION

However, the signal transmission device according to JP2003-526083A causes a resistance change of the magnetoresistive element by reversing a direction of current flowing in the signal conducting line on an input side. Thus, a circuit for reversing the direction of current flowing in the input signal conducting line is required, which has been a factor for hampering a reduction of size of an overall structure. Also, the signal transmission device according to JP2003-526083A is disadvantageous in that magnetic resistance to an external noise (for example, undesired magnetic field) is low in a period in which the reversing of the direction of the current is not performed, and thus malfunction of the signal transmission device may be incurred.

It is desirable to provide a signal transmission device having superior operation reliability yet having a further-simplified structure.

A signal transmission device according to an embodiment of the invention includes: an input signal conductor in which an input signal current flows and thereby generating an input signal magnetic field; a magnetically-biasing conductor in which a biasing current flows and thereby generating a biasing magnetic field; and one or more magnetoresistive elements in each of which a sensing current flows and thereby generating a self-biasing magnetic field, and each including a magnetization free layer having a magnetization direction which varies in response to the input signal magnetic field, the biasing magnetic field, and the self-biasing magnetic field, wherein each of the biasing magnetic field and the self-biasing magnetic field is applied to the magnetization free layer in a same direction to each other.

As used herein, the term "each of the biasing magnetic field and the self-biasing magnetic field is applied to the magnetization free layer in a same direction to each other" means that a vector of the biasing magnetic field mainly includes a vector component which is in parallel with a vector of the self-biasing magnetic field (which may be hereinafter referred to as the "parallel vector component"), for example. The term "mainly includes the parallel vector component" refers to a state in which the parallel vector component included in the vector of the biasing magnetic field is larger than a vector component which is orthogonal to the vector of the self-biasing magnetic field. In other words, an angle between the vector of the biasing magnetic field and the vector of the self-biasing magnetic field may be less than 45 degrees.

A signal transmission device according to another embodiment of the invention includes: an input signal conductor in which an input signal current flows and thereby generating an input signal magnetic field; a magnetically-biasing conductor in which a biasing current flows and thereby generating a biasing magnetic field; a first magnetoresistive element and a second magnetoresistive element in each of which a sensing current flows and thereby generating a self-biasing magnetic field, and each including a magnetization free layer having a magnetization direction which varies in response to the input signal magnetic field, the biasing magnetic field, and the self-biasing magnetic field, the first magnetoresistive element exhibiting a resistance change in an increasing-decreasing direction, and the second magnetoresistive element exhibiting a resistance change in another increasing-decreasing direction different from the increasing-decreasing direction of the first magnetoresistive element; and a difference detector outputting an output signal according to a difference between a resistance value of the first magnetoresistive element and a resistance value of the second magnetoresistive element, wherein each of the biasing magnetic field and the self-biasing magnetic field is applied to the magnetization free layer in a same direction to each other.

A signal transmission device according to yet another embodiment of the invention includes: an input signal conductor in which an input signal current flows and thereby generating an input signal magnetic field; a magnetically-biasing conductor in which a biasing current flows and thereby generating a biasing magnetic field; a first magnetoresistive element, a second magnetoresistive element, a third magnetoresistive element, and a fourth magnetoresistive element in each of which a sensing current flows and thereby generating a self-biasing magnetic field, and each including a magnetization free layer having a magnetization direction which varies in response to the input signal magnetic field, the biasing magnetic field, and the self-biasing magnetic field, each of the first magnetoresistive element to the fourth magnetoresistive element including a first terminal and a second terminal; and a difference detector. The first magnetoresistive element to the fourth magnetoresistive element establish a bridge circuit, in which the first terminal of the first magnetoresistive element and the first terminal of the second magnetoresistive element are connected in a first connection point, the first terminal of the third magnetoresistive element and the first terminal of the fourth magnetoresistive element are connected in a second connection point, the second terminal of the first magnetoresistive element and the second terminal of the fourth magnetoresistive element are connected in a third connection point, and the second terminal of the second magnetoresistive element and the second terminal of the third magnetoresistive element are connected in a fourth connection point. Both a resistance value of the first magnetoresistive element and a resistance value of the third magnetoresistive element change in a same increasing-decreasing direction, in response to the input signal magnetic field, the biasing magnetic field, and the self-biasing magnetic field. Both a resistance value of the second magnetoresistive element and a resistance value of the fourth magnetoresistive element change in another increasing-decreasing direction different from the increasing-decreasing direction of the first magnetoresistive element and the third magnetoresistive element, in response to the input signal magnetic field, the biasing magnetic field, and the self-biasing magnetic field. The difference detector detects a differential potential which appears between the first connection point and the second connection point when a voltage is applied between the third connection point and the fourth connection point. Each of the biasing magnetic field and the self-biasing magnetic field is applied to the magnetization free layer in a same direction to each other.

In the signal transmission device according to the embodiments of the invention, the magnetically-biasing conductor is included. Thus, magnetic resistance of the magnetoresistive element(s) to an external noise is increased even when the input signal current is zero or substantially zero, by previously applying the predetermined biasing magnetic field to the magnetoresistive element(s) from the magnetically-biasing conductor. Also, the magnetoresistive element(s) exhibits the resistance values which correspond to an off-state in which the input signal current does not flow and an on-state in which the input signal current flows, respectively. Thus, the magnetoresistive element(s) outputs two resistance values stably without reversing operation of reversing the direction of the input signal current. Thereby, a circuit for reversing the direction of current is eliminated, which is advantageous for a reduction of a size of an overall structure. In addition thereto, the self-biasing magnetic field which is in the same direction as that of the biasing magnetic field is applied to the magnetization free layer by the sensing current flowing in the magnetoresistive element(s). Thereby, the self-biasing magnetic field functions similarly to the biasing magnetic field.

According to any one of the embodiments of the invention, advantageously, the magnetically-biasing conductor and each of the magnetoresistive elements are connected in series to each other, and the biasing current is supplied to each of the magnetoresistive elements so as to work as the sensing current. Thereby, further reduction in power consumption at the time of driving operation, and simplification of the overall structure are attained.

According to any one of the embodiments of the invention, advantageously, inside the magnetization free layer, a direction of the input signal magnetic field is opposite to a direction of both the biasing magnetic field and the self-biasing magnetic field. Thereby, a negative output is obtained from the magnetoresistive element(s) in the state where the input signal current does not flow (i.e., the off state), whereas a positive output is obtained therefrom in the state where the input signal current flows (i.e., the on state). Thus, more accurate output signals are obtained easily in a stable fashion.

According to any one of the embodiments of the invention, advantageously, a width of the magnetically-biasing conductor is different from a width of each of the magnetoresistive elements. This makes it possible to achieve a configuration which is advantageous for increasing an accuracy of size of the magnetoresistive element(s) and the magnetically-biasing conductor when the magnetoresistive element(s) and the magnetically-biasing conductor are to be formed with a patterning method. In particular, the biasing magnetic field, which is more homogenized in a width direction thereof, is applied to the magnetoresistive element(s), when the width of the magnetically-biasing conductor is advantageously made larger than the width of each of the magnetoresistive elements. On the other hand, the biasing magnetic field having a higher peak value is applied to the magnetoresistive element(s) when the width of the magnetically-biasing conductor is advantageously made smaller than the width of each of the magnetoresistive elements.

According to any one of the embodiments of the invention, advantageously, the magnetically-biasing conductor includes a thin-film coil wound along a film plane, and the plurality of magnetoresistive elements extends along the magnetically-biasing conductor. Thereby, the biasing magnetic field reaches the magnetoresistive element(s) more effectively, and sensitivity of the magnetoresistive element(s) to the biasing magnetic field is further increased.

According to any one of the embodiments of the invention, advantageously, the input signal conductor, the magnetically-biasing conductor, and each of the magnetoresistive elements are so stacked as to be overlapped one another in a thickness direction thereof. Thereby, the compact overall structure as well as highly-efficient signal transmission are achieved.

According to the signal transmission device of the embodiments of the invention, the magnetically-biasing conductor is included. Therefore, by previously applying the predetermined biasing magnetic field to the magnetoresistive element(s) at the time of driving operation, it is possible to suppress malfunction caused by the external noise, and to improve operation stability. Also, the direction to which each of the biasing magnetic field and the self-biasing magnetic field is applied to the magnetization free layer of the magnetoresistive element(s) is in the same direction to each other. Therefore, it is possible to apply the desired biasing magnetic field to the magnetoresistive element(s) even with the smaller biasing magnetic field. As a result, it is possible to reduce power consumption at the time of performing signal transmission.

In particular, according to the signal transmission device of the embodiments of the invention, a power source is shared when the magnetically-biasing conductor and each of the magnetoresistive elements are connected in series to each other, and the biasing current is supplied to each of the magnetoresistive elements so as to work as the sensing current. Therefore, it is possible to achieve the reduction of power consumption at the time of driving operation, and to attain the simplification of the overall structure. Meanwhile, it may be contemplated to employ a configuration in which, instead of the magnetically-biasing conductor, a permanent magnet is disposed near the magnetoresistive element(s) to generate the biasing magnetic field. However, a size of such a permanent magnet becomes large to some extent in order to obtain the biasing magnetic field having a predetermined magnitude, which is not preferable in achieving the simplification of the overall structure.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the specification, serve to explain the principles of the invention.

FIG. 6A and FIG. 6B are explanatory views for describing directions of magnetic fields reaching the magnetoresistive element in the signal transmission device illustrated in FIG. 1, respectively.

FIG. 16A and FIG. 16B are explanatory views for describing directions of magnetic fields reaching a magnetoresistive element in a signal transmission device according to a third Modification, respectively.

DETAILED DESCRIPTION OF THE PREFERRED EMBODIMENTS

Hereinafter, an embodiment of the present invention will be described in detail with reference to the accompanying drawings.

Figure 1:
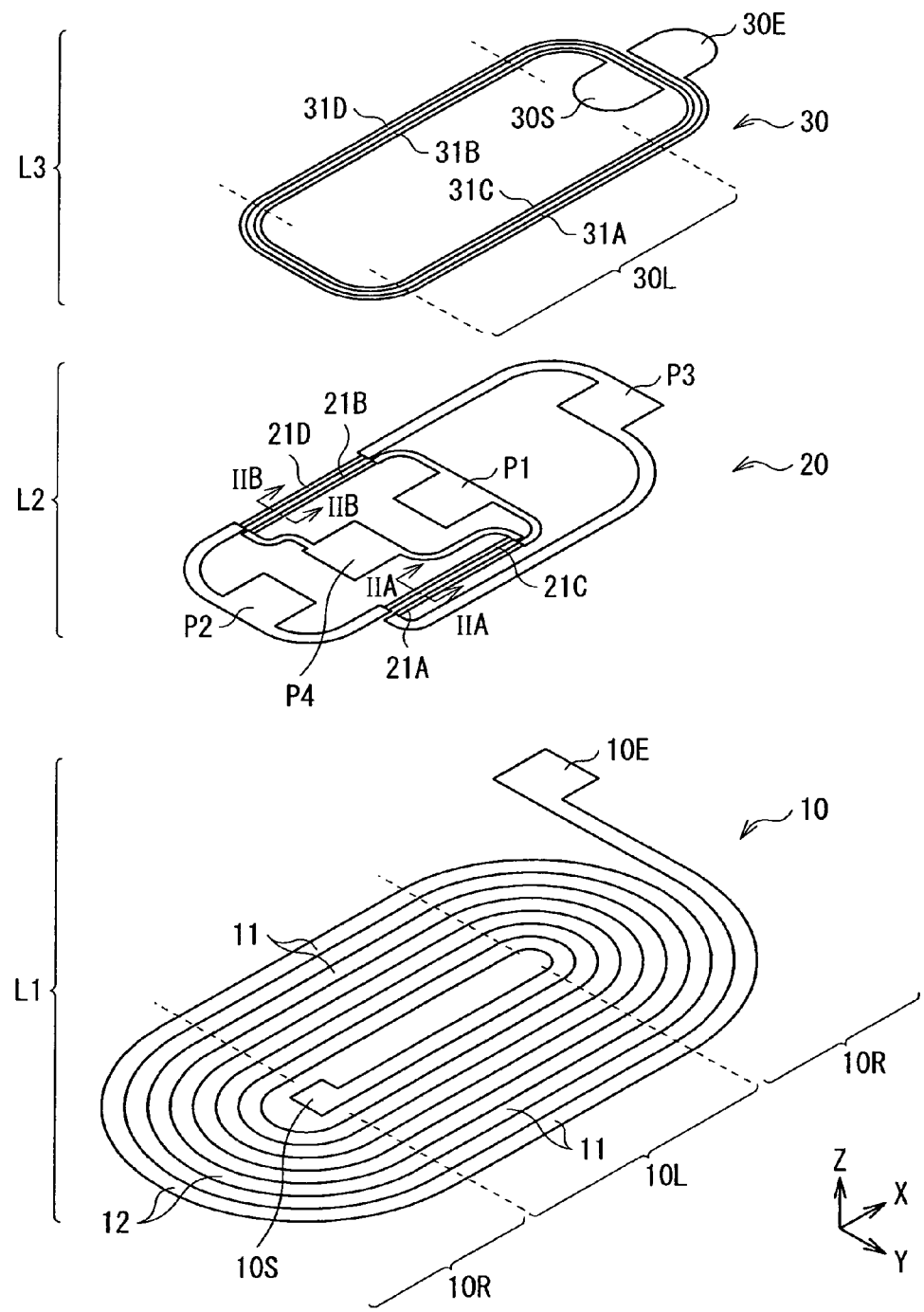
FIG. 1 is a perspective view illustrating a configuration of a signal transmission device according to an embodiment of the invention.
Figure 2:
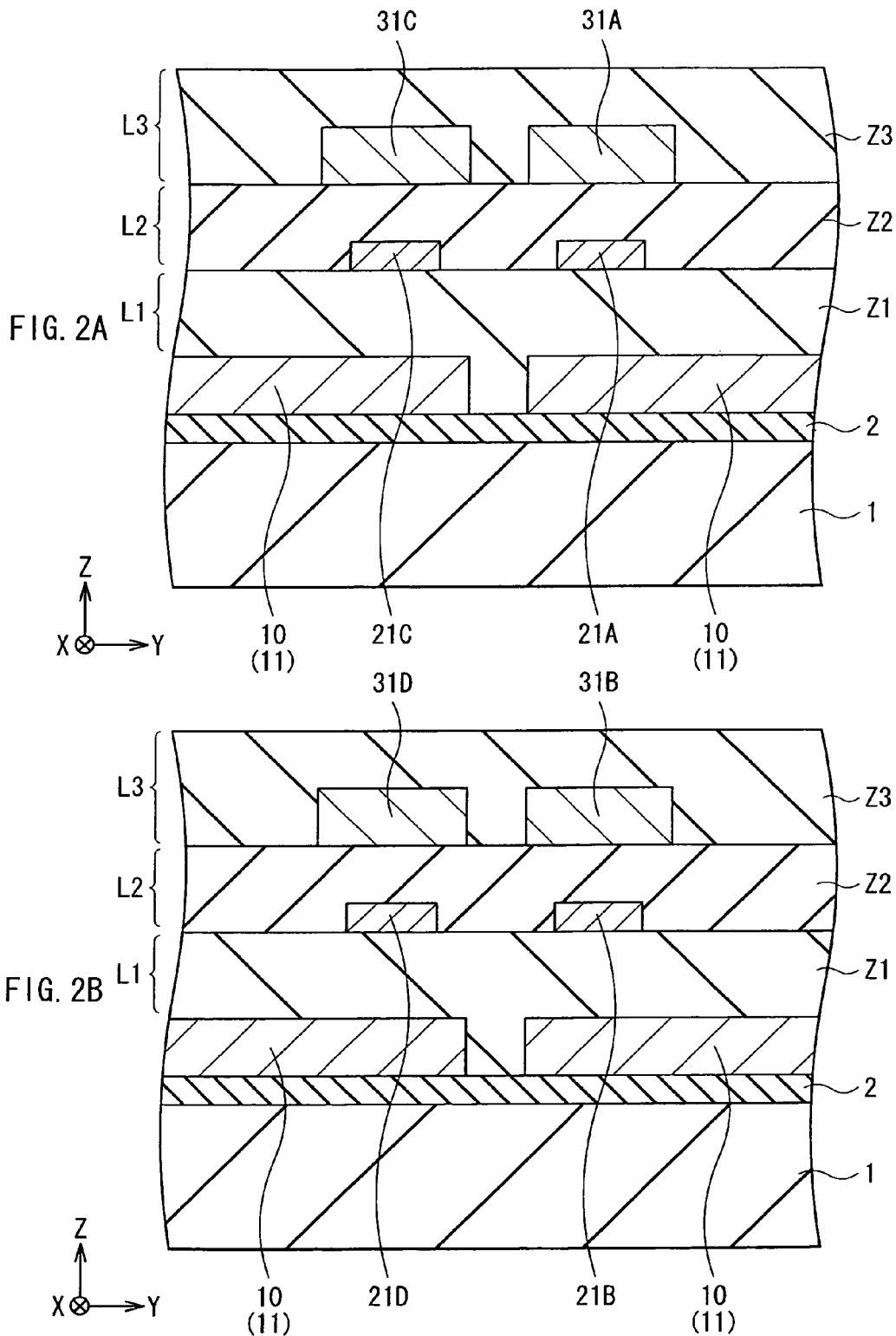
FIG. 2A and FIG. 2B are cross-sectional views illustrating configurations of major parts of the signal transmission device taken along lines IIA-IIA and IIB-IIB in FIG. 1, respectively.

First, a configuration of a signal transmission device according to one embodiment of the invention will be described with reference to FIG. 1 to FIG. 2B. FIG. 1 illustrates a perspective configuration of the signal transmission device according to the present embodiment. FIG. 2A and FIG. 2B illustrate cross-sectional configurations taken along a line IIA-IIA and a line IIB-IIB and viewed from an arrow direction (i.e., in a − (minus) X axis direction) in an expanded fashion, respectively. This signal transmission device transmits a signal from a certain electric circuit to another electric circuit while maintaining an electrically non-contact state. The signal transmission device is effective for transmitting a desired signal while blocking a noise.

The signal transmission device has a stacked structure, in which a first layer L1 including a primary coil 10, a second layer L2 including a detection circuit 20, and a third layer L3 including a magnetically-biasing coil 30 are stacked in order on a substrate 1. The substrate 1 supports the entire signal transmission device. The substrate 1 can be rectangular, and can be configured of a glass, silicon (Si), aluminum oxide ($Al_2O_3$), or other suitable material. Note that an insulating layer 2 may be provided to cover the substrate 1 as illustrated in FIGS. 2A and 2B. The insulating layer 2 can be a silicon oxide ($SiO_2$), or other suitable material.

Each of the primary coil 10 and the magnetically-biasing coil 30 is a single thin-film conductor in which a thin-film configured of a metal material having high electric conductivity is wound in a stacked plane. The metal material of the thin-film can be copper (Cu), or other suitable material. Note that the number of windings (i.e., the number of turns) of each of the primary coil 10 and the magnetically-biasing coil 30 is not limited to that illustrated in FIG. 1.

The primary coil 10 is provided with two terminals, i.e., a terminal 10S on one end and a terminal 10E on the other end thereof. The primary coil 10 is wound counterclockwise from the terminal 10S located at the center of the winding to the terminal 10E located at an outer periphery of the winding, when viewed from the second layer L2 side, for example.

The primary coil 10 includes a pair of linear regions 10L, and a pair of curved regions 10R so provided as to connect the pair of linear regions 10L. Each of the linear regions 10L includes a plurality of linear portions 11, each of which extends linearly in an X-axis direction and arranged at predetermined intervals in a Y-axis direction, for example. Each of the curved regions 10R includes a plurality of curved portions 12 having respectively a curved configuration and connected to the linear portions 11. It is desirable that a cross-sectional area of each of the linear portions 11 be uniform mutually in a longitudinal direction (i.e., in the X-axis direction). Further, it is desirable that each of the linear portions 11 have the cross-sectional area which is equal mutually, and be aligned at equal intervals mutually. The primary coil 10 generates an input signal magnetic field Hm therearound when an input signal current Im flows from the terminal 10S to the terminal 10E. The input signal magnetic field Hm and the input signal current Im will be described later in greater detail.

The magnetically-biasing coil 30 is provided with two terminals, i.e, a terminal 30S on one end and a terminal 30E on the other end thereof. The magnetically-biasing coil 30 is wound clockwise from the terminal 30S located at the center of the winding to the terminal 30E located at an outer periphery of the winding, when viewed from the second layer L2 side, for example. The magnetically-biasing coil 30 includes linear portions 31 (linear portions 31A to 31D) extending along the plurality of linear portions 11 of the primary coil 10.

The magnetically-biasing coil 30 generates a biasing magnetic field Hb therearound when a biasing current Ib is supplied from the terminal 30S. The biasing current Ib and the biasing magnetic field Hb will be described later in greater detail.

The detection circuit 20 is a bridge circuit in which four magnetoresistive (which may be simply referred to as "MR" hereinafter) elements 21 (MR elements 21A to 21D) are bridge-connected. Each of the MR elements 21 (MR elements 21A to 21D) is a strip-like thin-film pattern extending along the linear portions 11 of the primary coil 10 and along the linear portions 31 (the linear portions 31A to 31D) of the magnetically-biasing coil 30. The MR elements 21A to 21D have a one-to-one correspondence relationship with the linear portions 31A to 31D, respectively. More specifically, as illustrated in FIG. 2A, the MR element 21A is located at a position overlapped with the linear portion 31A in a direction of stack (i.e., in a Z-axis direction), and the MR element 21C is located at a position overlapped with the linear portion 31C in the stack direction. Similarly, as illustrated in FIG. 2B, the MR element 21B is located at a position overlapped with the linear portion 31B in the stack direction, and the MR element 21D is located at a position overlapped with the linear portion 31D in the stack direction. The MR elements 21 have the above-described positional relationship with the primary coil 10 and with the magnetically-biasing coil 30. Thus, the MR elements 21 are influenced by the input signal magnetic field Hm from the primary coil 10 and by the biasing magnetic field Hb from the magnetically-biasing coil 30. Further, the MR elements 21 are supplied with a sensing current I (sensing currents I1 or I2) which flows in a direction to which each of the MR elements 21 extends. Each of the MR elements 21 generates a self-biasing magnetic field Hsb which revolves therearound when the sensing currents I1 and I2 flow. The self-biasing magnetic field Hsb will be described later in greater detail.

It is desirable that a width of each of the MR elements 21 (i.e., a size in the Y-axis direction) be different from a width of each of the linear portions 31, since this makes it easier to process a planar configuration of the MR elements 21 and a planar configuration of the linear portions 31 with high precision when the MR elements 21 and the linear portions 31 are to be formed. As illustrated in FIGS. 2A and 2B, a magnitude of the biasing magnetic field Hb applied to the MR elements 21 is more homogenized in a width direction when the width of the linear portions 31 is made larger than the width of the MR elements 21. On the other hand, a peak value of the biasing magnetic field Hb applied to the MR elements 21 is more increased when the width of the linear portions 31 is made smaller than the width of the MR elements 21.

Figure 3:
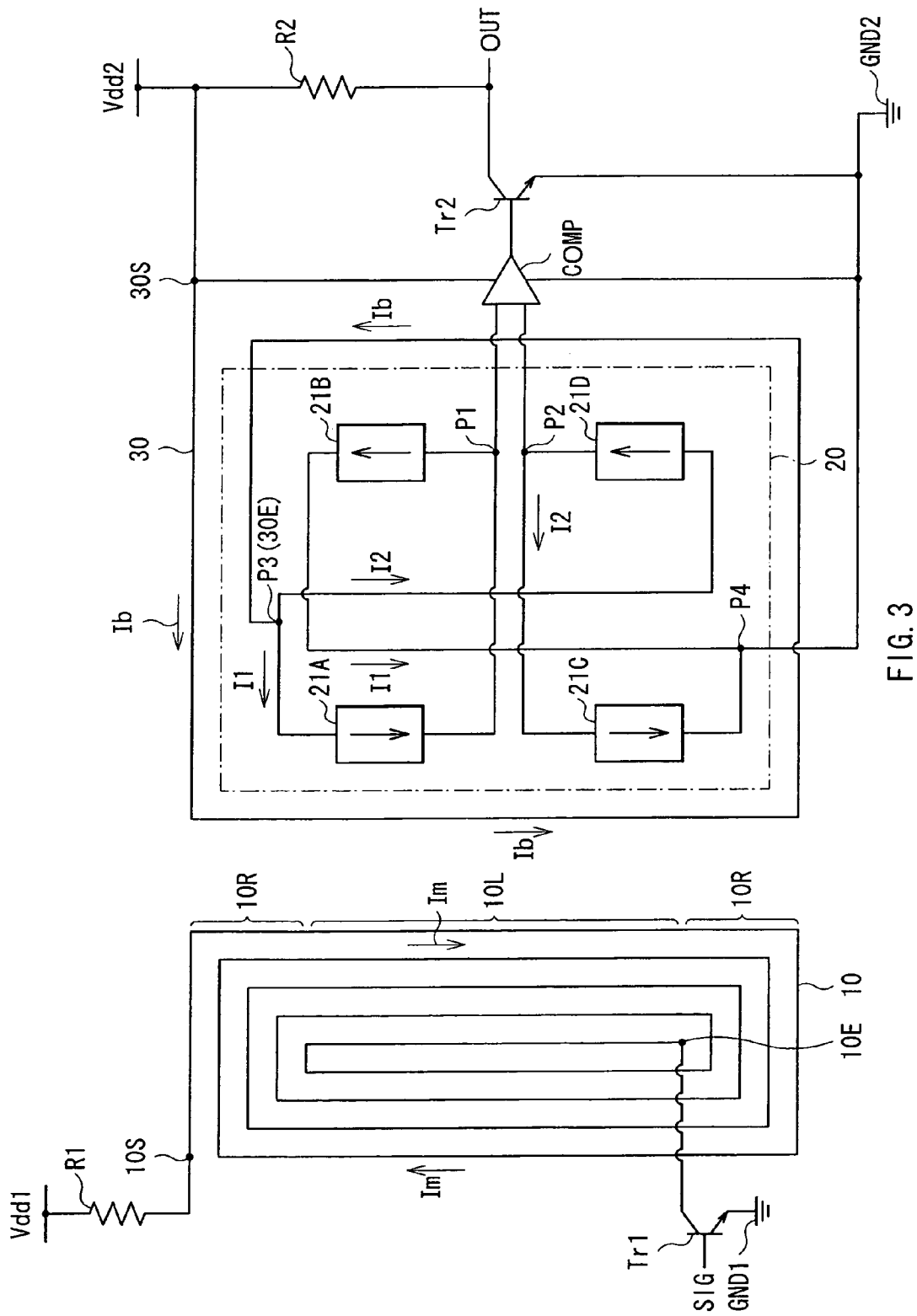
FIG. 3 is a circuit diagram of the signal transmission device illustrated in FIG. 1.

As illustrated in FIG. 3, the detection circuit 20 includes a connection point P1 as a first differential output terminal, a connection point P2 as a second differential output terminal, a connection point P3 as a magnetically-biasing coil connecting terminal, and a connection point P4 as a ground terminal. One end of the MR element 21A and one end of the MR element 21B are connected together in the connection point P1, and one end of the MR element 21C and one end of the MR element 21D are connected together in the connection point P2. Further, the other end of the MR element 21A and the other end of the MR element 21D are connected together in the connection point P3, and the other end of the MR element 21B and the other end of the MR element 21C are connected together in the connection point P4, to establish the bridge circuit. Each of the connection points P1 to P4 is a thin-film pattern configured of a non-magnetic material having high electric conductivity. Such a non-magnetic material can be copper (Cu), or other suitable material.

Referring to FIG. 2A and FIG. 2B, the primary coil 10, the detection circuit 20, and the magnetically-biasing coil 30 are covered with insulating films Z1 to Z3 in the first layer L1 to the third layer L3, respectively, so as to be electrically insulated one another. On the other hand, the connection point P3 is electrically connected with the terminal 30E of the magnetically-biasing coil 30 through an unillustrated through-hole. The insulating films Z1 to Z3 can be configured of $Al_2O_3$, or other suitable material.

Each of the MR elements 21 causes a change in a resistance value thereof in response to a direction and a magnitude of each of the input signal magnetic field Hm, the biasing magnetic field Hb, and the self-biasing magnetic field Hsb which are applied thereto. More specifically, the resistance values of the MR element 21A and the MR element 21C change in the same direction (increasing-decreasing direction) to each other in response to applied magnetic fields including the input signal magnetic field Hm and so forth, respectively. The resistance values of the MR element 21B and the MR element 21D change in a direction opposite to that of the resistance values of the MR elements 21A and 21C (another increasing-decreasing direction), in response to the applied magnetic fields including the input signal magnetic field Hm and so forth, respectively. In other words, the MR elements 21 have a relationship in which the resistance value of the MR elements 21B and 21D decreases when the resistance value of the MR elements 21A and 21C is increased, or vice versa. A configuration of the MR elements 21 will be described later in greater detail.

Now, a circuit configuration of the signal transmission device illustrated in FIG. 1 will be described with reference to FIG. 3.

The primary coil 10 is electrically insulated from the magnetically-biasing coil 30 and the detection circuit 20. The terminal 10S of the primary coil 10 is connected to a power source Vdd1 through a resistor R1. The resistor R1 limits a current to be flown to the primary coil 10, and may be provided on an as-needed basis. The terminal 10E of the primary coil 10 is connected to a collector terminal of an emitter-grounded transistor Tr1, in which an emitter terminal of the transistor Tr1 is grounded to a ground GND1, and an input signal SIG is input to a base terminal of the transistor TR1, for example. Such a configuration of the primary coil 10 allows the input signal current Im to flow in the primary coil 10 in a direction indicated by an arrow in accordance with the input signal SIG.

In the magnetically-biasing coil 30, the terminal 30S thereof is connected to a power source Vdd2. The other terminal 30E of the magnetically-biasing coil 30 is connected to the detection circuit 20 in the connection point P3 as described above. Thereby, the biasing current Ib, which has flowed through the magnetically-biasing coil 30, then flows in the detection circuit 20 as the sensing current I. The biasing current Ib is divided into the sensing current I1 and the sensing current I2 at the connection point P3. The sensing current I1 first passes through the MR element 21A, and then travels toward the MR element 21B via the connection point P1. The sensing current I1 then passes through the MR element 21B, and reaches the connection point P4 thereafter. On the other hand, the sensing current I2 first passes through the MR element 21D, and then travels toward the MR element 21C via the connection point P2. The sensing current I2 then passes through the MR element 21C, and thereafter reaches the connection point P4, at which the sensing current I2 merges with the sensing current I1. Accordingly, the sensing currents I1 and I2 flow along the biasing current Ib flowing in the linear portions A to 31D of the magnetically-biasing coil 30 when the sensing currents I1 and I2 pass through the corresponding MR elements 21A to 21D, respectively. It is to be noted that an arrow inside the rectangular boxes denoted as the MR elements 21A to 21D each indicates a direction to which the sensing current I1 or the sensing current I2 flows.

Further, in the signal transmission device according to the present embodiment, the connection point P1 as a midpoint of the MR element 21A and the MR element 21B, and the connection point P2 as a midpoint of the MR element 21C and the MR element 21D, are connected to a comparator COMP, as illustrated in FIG. 3. The comparator COMP calculates a difference Vdiff between a potential of the connection point P1 and a potential of the connection point P2 (i.e., the comparator COMP obtains the differential potential Vdiff), and outputs a signal corresponding to a value of the differential potential Vdiff. More specifically, the comparator COMP outputs a low-level signal when the differential potential Vdiff is equal to or less than a threshold value Vth1, and outputs a high-level signal when the differential potential Vdiff is equal to or more than a threshold value Vth2. That is, the comparator COMP functions as an output circuit which outputs an output signal OUT in accordance with the resistance value of the MR elements 21A to 21D. In one embodiment, the connection point P1 of the MR element 21A and the MR element 21B is connected to a non-inverting input terminal of the comparator COMP, whereas the connection point P2 of the MR element 21C and the MR element 21D is connected to an inverting input terminal of the comparator. COMP. Also, a power source terminal of the comparator COMP is connected to the power source Vdd2, and a ground terminal of the comparator COMP is connected to a ground GND2. Further, an output terminal of the comparator COMP is connected to a base terminal of an emitter-grounded transistor Tr2. An emitter terminal of the transistor Tr2 is connected to the ground GND2, and a collector terminal of the transistor Tr2 serves as an output terminal at which the output signal OUT is output. The collector terminal of the transistor Tr2 is also connected to the power source Vdd2 through a resistor R2. The ground GND2 is further connected with the connection point P4 of the MR element 21B and the MR element 21C.

Figure 4A:
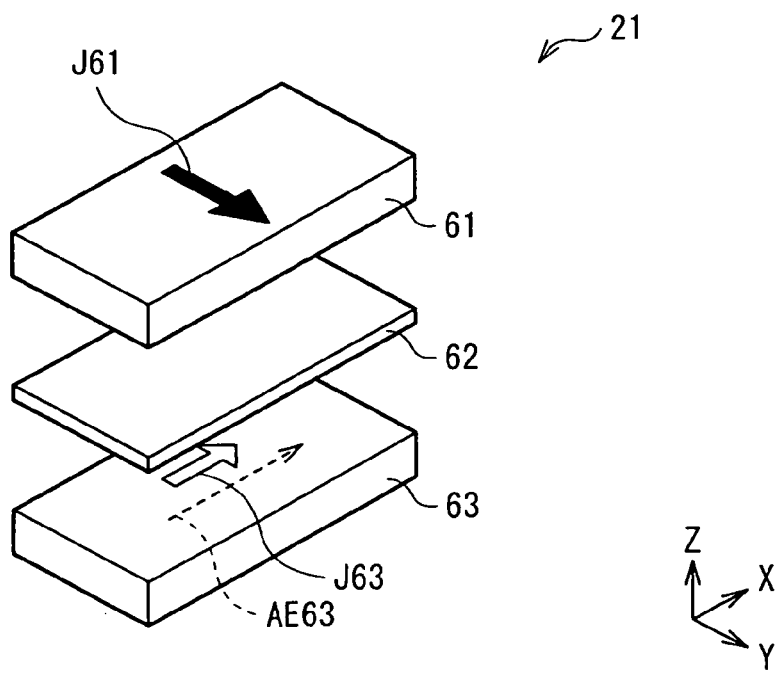
FIG. 4A and FIG. 4B are exploded perspective views illustrating respectively a detailed configuration of a magnetoresistive element in a detection circuit illustrated in FIG. 1.
Figure 4B:
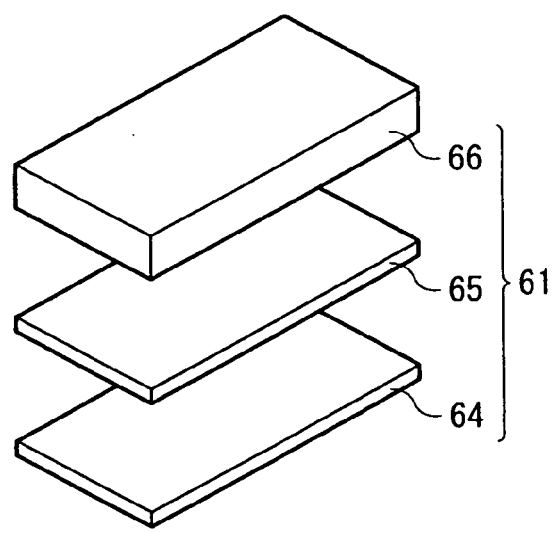

Now, the configuration of the MR elements 21 will be described in greater detail with reference to FIGS. 4A and 4B. FIG. 4A and FIG. 4B are exploded perspective views illustrating respectively the configuration of the MR element 21 (the MR elements 21A to 21D) in an exploded fashion. Since the MR elements 21A to 21D have the same configuration one another, description thereof will be set forth collectively.

As illustrated in FIG. 4A, each of the MR elements 21 has a spin-valve configuration, and includes a structure in which a pinned layer 61, an intermediate layer 62, and a free layer 63 are stacked in order. The pinned layer 61 has a magnetization J61 pinned in a + (plus) Y axis direction, for example. The intermediate layer 62 has a non-magnetic property and does not exhibit a particular magnetization. The free layer 63 has a magnetization J63 which changes in response to the magnitude and the direction of the applied magnetic fields including the input signal magnetic field Hm and so forth. It is preferable that an easy axis of magnetization AE of the free layer 63 be in parallel with the X-axis. Note that FIG. 4A illustrates a no-load state in which the input signal magnetic field Hm, the biasing magnetic field Hb, and so forth are not applied (i.e., a state in which an external magnetic field is zero). In this state, a direction of the magnetization J63 of the free layer 63 is in parallel with its own easy axis of magnetization AE, and is substantially orthogonal to the magnetization J61 of the pinned layer 61.

The free layer 63 is configured of a soft magnetic material, which can be a nickel-iron alloy (NiFe), or other suitable material. The intermediate layer 62 is configured of a non-magnetic metal having high electric conductivity, and includes an upper surface which contacts with the pinned layer 61, and a lower surface which contacts with the free layer 63. The non-magnetic metal of the intermediate layer 62 can be copper (Cu), gold (Au), or other suitable material. The intermediate layer 62 also serves as a path line through which most of the sensing current I1 or I2 flows. A lower surface of the free layer 63 (i.e., a surface on the opposite side of a surface thereof facing the intermediate layer 62) may be protected by an unillustrated protecting film. Also, an exchange biasing magnetic field Hin is produced between the pinned layer 61 and the free layer 63 (hereinafter simply referred to as "exchange biasing magnetic field Hin") in the direction of the magnetization J61, and thus the pinned layer 61 and the free layer 63 interact each other through the intermediate layer 62. The strength of the exchange biasing magnetic field Hin changes by a rotation of spin direction in the free layer 63, according to a mutual distance between the pinned layer 61 and the free layer 63 (i.e., a thickness of the intermediate layer 62). Thus, the exchange biasing magnetic field Hin may even be set to have apparently zero exchange biasing magnetic field. It is to be noted that FIG. 4A illustrates an example of the configuration where the free layer 63, the intermediate layer 62, and the pinned layer 61 are stacked in order from below, although it is not limited thereto. The MR element 21 may have a configuration where the pinned layer 61, the intermediate layer 62, and the free layer 63 are stacked in order from below.

FIG. 4B illustrates a detailed configuration of the pinned layer 61. The pinned layer 61 has a configuration in which a magnetization fixed film 64, an anti-ferromagnetic film 65, and a protecting film 66 are stacked in order from the intermediate layer 62 side, for example. The magnetization fixed film 64 is configured of a ferromagnetic material, which can be cobalt (Co), a cobalt-iron alloy (CoFe), or other suitable material. A direction of magnetization exhibited by the magnetization fixed film 64 determines the direction of the magnetization J61 of the pinned layer 61 as a whole. The anti-ferromagnetic film 65 is configured of an anti-ferromagnetic material, which can be a platinum-manganese alloy (PtMn), an iridium-manganese alloy (IrMn) alloy, or other suitable material. The anti-ferromagnetic film 65 is in a state in which a spin magnetic moment in the + (plus) X axis direction and a spin magnetic moment in an opposite direction thereto (i.e., in the − (minus) X axis direction) are completely canceled each other, and thus acts to fix the direction of magnetization of the magnetization fixed film 64 (i.e., the direction of magnetization J61 of the pinned layer 61). The protecting film 66 is configured of a non-magnetic material which is relatively chemically stable, and protects the magnetization fixed film 64, the anti-ferromagnetic film 65, and so forth. The non-magnetic material of the protecting film 66 can be tantalum (Ta), hafnium (Hf), or other suitable material.

In the MR element 21 having the configuration described above, the magnetization J63 of the free layer 63 is rotated by the application of the input signal magnetic field Hm, the biasing magnetic field Hb, and the self-biasing magnetic field Hsb, and thereby a relative angle between the magnetization J63 and the magnetization J61 changes. The relative angle is determined by the magnitude and the direction of the applied magnetic fields including the input signal magnetic field Hm and so forth. More specifically, when a component of the applied magnetic fields (such as the input signal magnetic field Hm) which is in parallel with or antiparallel to the magnetization J61 (i.e., the component in + (plus) Y axis direction or in − (minus) Y axis direction) is applied to the MR element 21, the direction of the magnetization J63 is inclined from the no-load state illustrated in FIG. 4A to the + (plus) Y axis direction or to the − (minus) Y axis direction, and thereby the resistance value of the MR element 21 is increased or decreased. That is, when the applied magnetic fields including the input signal magnetic field Hm and so forth are applied in the + (plus) Y axis direction, the magnetization J63 is inclined in the + (plus) Y axis direction, and thus the resistance value of the MR element 21 decreases since the magnetization J63 becomes nearly parallel to the magnetization J61. On the other hand, when the applied magnetic fields including the input signal magnetic field Hm and so forth are applied in the − (minus) Y axis direction, the magnetization J63 is inclined in the − (minus) Y axis direction, and thus the resistance value of the MR element 21 increases since the magnetization J63 becomes nearly antiparallel to the magnetization J61.

Now, operation of the signal transmission device according to the present embodiment will be described with reference to FIG. 5 to FIG. 7B in addition to FIG. 1 to FIG. 4B.

Figure 5:
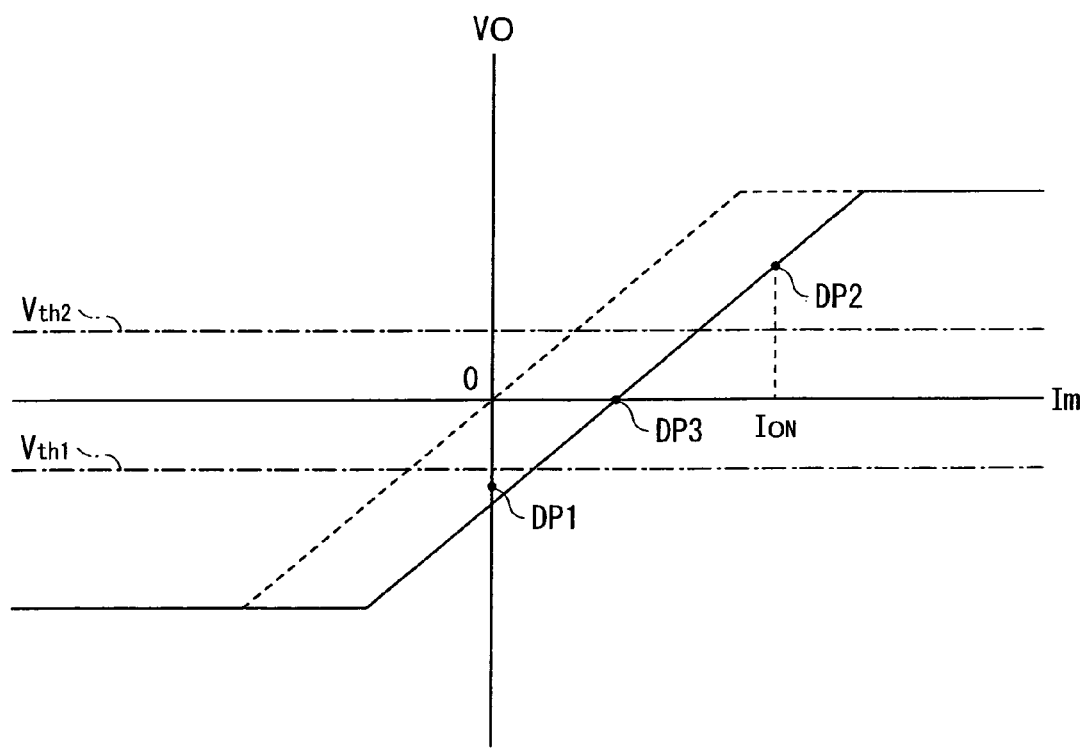
FIG. 5 is a characteristic diagram for describing operating points of the detection circuit illustrated in FIG. 1.

FIG. 5 is a characteristic diagram for describing operating points of the detection circuit 20, in which a horizontal axis represents a magnitude of the input signal current Im flowing in the primary coil 10, whereas a vertical axis represents a magnitude of the output signal OUT from the detection circuit 20. A solid line in FIG. 5 represents a change in the output with respect to a change in the input signal current Im (i.e., the differential potential Vdiff), when a fixed amount of biasing current Ib is caused to flow in the magnetically-biasing coil 30 and when the sensing currents I1 and I2 are caused to flow in the detection circuit 20. A dashed line in FIG. 5 represents the change in the output with respect to the change in the input signal current Im (i.e., the differential potential Vdiff), when assumed that the biasing current Ib is not caused to flow in the magnetically-biasing coil 30 and only the sensing currents I1 and I2 are caused to flow in the detection circuit 20. FIG. 5 is based on the assumption that the fixed amount of biasing current Ib (as well as the sensing currents I1 and I2) is supplied constantly when the signal transmission device is to be driven. Further, Vth1 and Vth2 in FIG. 5 represent the threshold values for determining whether or not the comparator COMP performs the output operation, respectively.

Also, each of FIGS. 6A to 7B is a schematic cross-sectional view corresponding to FIGS. 2A and 2B which illustrate respectively neighborhoods of the MR elements 21A to 21D in an expanded fashion, and schematically illustrates a relationship between directions to which the currents flow and directions of the magnetic fields reaching the MR elements 21A to 21D in a simplified fashion.

First, a state where the input signal current Im flowing in the primary coil 10 is 0 (zero), i.e., a logical value of the input signal SIG is "0", will be described. In this state, the operating point of the detection circuit 20 is at a position denoted by DP1, and the magnitude of each of the biasing magnetic field Hb and the self-biasing magnetic field Hsb is so adjusted that the differential potential Vdiff has a value which is less than the threshold value Vth1, as illustrated in FIG. 5. FIGS. 6A and 6B illustrate respectively the relationship between the directions to which the currents flow and the directions of the magnetic fields generated by that currents corresponding to this state. FIG. 6A illustrates behaviors of the MR element 21B (or 21D) and its neighborhood, and FIG. 6B illustrates behaviors of the MR element 21A (or 21C) and its neighborhood. In this state, in the MR element 21B (or 21D) and in the linear portion 31B (or 31D), the sensing current I1 (or I2) and the biasing current Ib flow therein in the − (minus) X axis direction (a direction from a back side to a front side in the drawing) respectively, as illustrated in FIG. 6A. As a result, the self-biasing magnetic field Hsb centered about the intermediate layer 62 of the MR element 21B (or 21D), and the biasing magnetic field Hb centered about the linear portion 31B (or 31D) of the magnetically-biasing coil 30, are generated. Here, the self-biasing magnetic field Hsb and the biasing magnetic field Hb both reach the free layer 63 of the MR element 21B (or 21D) in the same direction to each other (i.e., in the +(plus) Y axis direction). On the other hand, in the MR element 21A (or 21C) and the linear portion 31A (or 31C), the sensing current I1 (or I2) and the biasing current Ib flow therein in the + (plus) X axis direction (a direction from a front side to a back side in the drawing), respectively, as illustrated in FIG. 6B. As a result, the self-biasing magnetic field Hsb centered about the intermediate layer 62 of the MR element 21A (or 21C), and the biasing magnetic field Hb centered about the linear portion 31A (or 31C) of the magnetically-biasing coil 30, are generated. Here, the self-biasing magnetic field Hsb and the biasing magnetic field Hb both reach the free layer 63 of the MR element 21A (or 21C) in the same direction to each other (i.e., in the − (minus) Y axis direction).

Figures 7A, 7B:
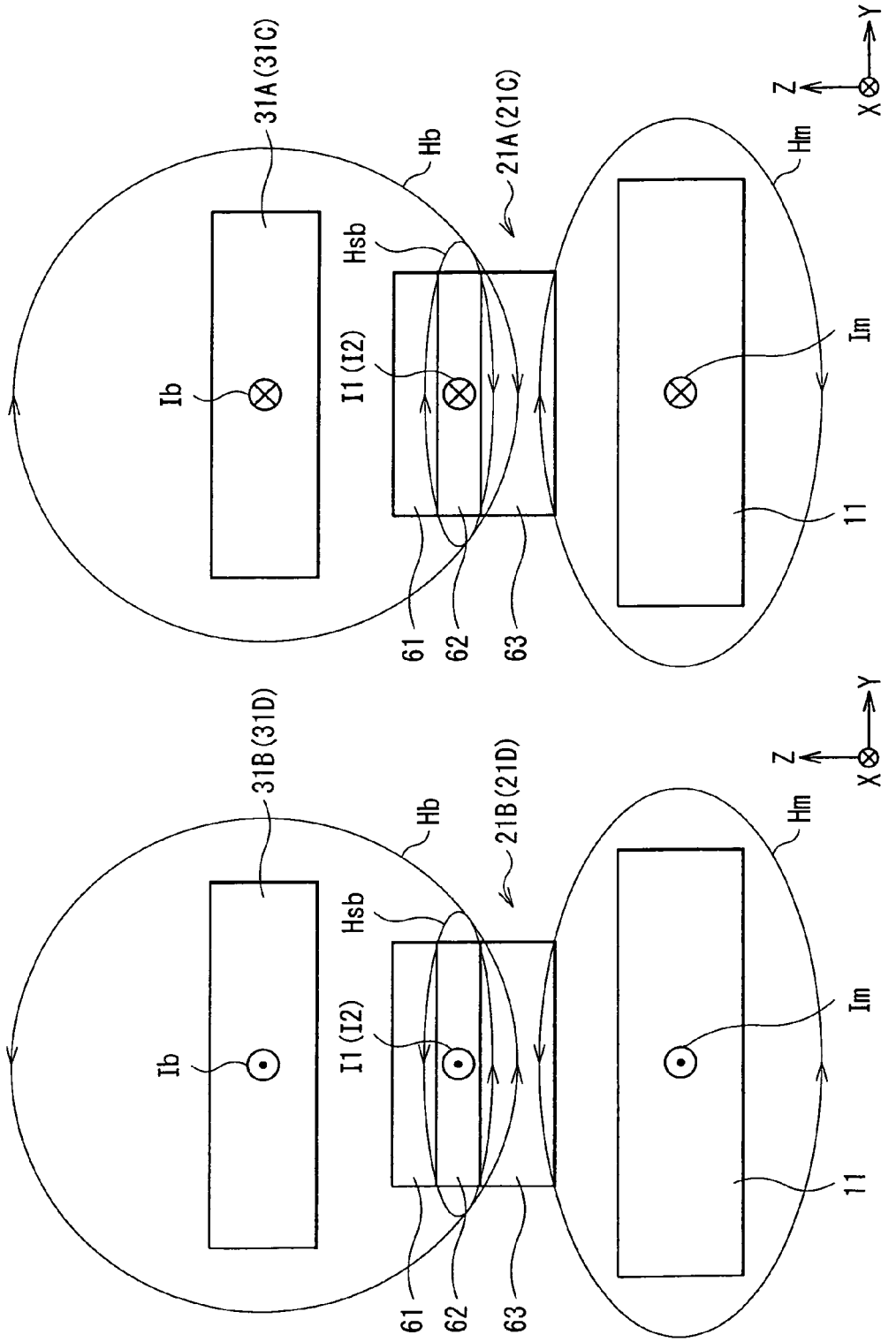
FIG. 7A and FIG. 7B are another explanatory views for describing the directions of the magnetic fields reaching the magnetoresistive element in the signal transmission device illustrated in FIG. 1, respectively.

Next, a state where the input signal current Im flowing in the primary coil 10 is at $I_{ON}$, i.e., the logical value of the input signal SIG is "1", will be described. In this state, the operating point of the detection circuit 20 is at a position denoted by DP2, and the magnitude of each of the biasing magnetic field Hb and the self-biasing magnetic field Hsb is so adjusted that the differential potential Vdiff has a value which is larger than the threshold value Vth2, as illustrated in FIG. 5. FIGS. 7A and 7B illustrate respectively the relationship between the directions to which the currents flow and the directions of the magnetic fields generated by that currents corresponding to this state. FIG. 7A illustrates the behaviors of the MR element 21B (or 21D) and its neighborhood, and FIG. 7B illustrates the behaviors of the MR element 21A (or 21C) and its neighborhood. In this state, in the linear portions 11 in the vicinity of the MR element 21B (or 21D) of the primary coil 10, the input signal current Im flows therein in the − (minus) X axis direction (a direction from a back side to a front side in the drawing). Thus, the input signal magnetic field Hm, which is in an opposite direction (i.e., in the − (minus) Y axis direction) to the self-biasing magnetic field Hsb and to the biasing magnetic field Hb, reaches the free layer 63 of the MR element 21B (or 21D), as illustrated in FIG. 7A. On the other hand, in the linear portions 11 in the vicinity of the MR element 21A (21C) of the primary coil 10, the input signal current Im flows therein in the + (plus) X axis direction (a direction from a front side to a back side in the drawing). Thus, the input signal magnetic field Hm, which is in an opposite direction (i.e., in the + (plus) Y axis direction) to the self-biasing magnetic field Hsb and to the biasing magnetic field Hb, reaches the free layer 63 of the MR element 21A (or 21C), as illustrated in FIG. 7B.

Accordingly, in the signal transmission device according to the present embodiment, the biasing magnetic field Hb and the self-biasing magnetic field Hsb are applied to the free layer 63 in the same direction, by the suitable selection for the positional relationship among the intermediate layer 62, the free layer 63, and the linear portions 31A to 31D in a laminated cross section (in Y-Z plane) and for the direction of the biasing current Ib and the sensing currents I1 and I2.

Here, the operating point at which the differential potential Vdiff becomes 0 (zero) is located at a position denoted by DP3 (i.e., the operating point is positioned between the threshold value Vth1 and the threshold value Vth2) when a value of the input signal current Im is set to be half the value of the $I_{ON}$ (Im=$I_{ON}$/2), by which the most preferable condition for avoiding erroneous determination of the comparator COMP is obtained.

When the logical value of the input signal SIG is "0", a base potential of the transistor Tr1 is brought to a low level, and thus the transistor Tr1 is turned off. Hence, the input signal current Im does not flow in the primary coil 10 (Im=0), and the input signal magnetic field Hm is not generated accordingly. As described above, the magnitude of each of the biasing magnetic field Hb and the self-biasing magnetic field Hsb is so adjusted that the differential potential Vdiff has the value which is less than the threshold value Vth1 when there is no input signal magnetic field Hm. Thus, a value of the output of the comparator COMP is brought to a low level, and a base potential of the transistor Tr2 attains a low level. Accordingly, the transistor Tr2 is turned off, and a collector potential thereof is brought to a high level. As a result, the logical value of the output signal OUT attains a high level.

When the logical value of the input signal SIG is "1", the base potential of the transistor Tr1 is brought to a high level, and thus the transistor Tr 1 is turned on. Hence, the input signal current Im flows in the primary coil 10 (Im=$I_{ON}$), and the input signal magnetic field Hm is generated accordingly. As described above, the magnitude of each of the biasing magnetic field Hb and the self-biasing magnetic field Hsb is so adjusted that the differential potential Vdiff has the value which is larger than the threshold value Vth2 when the input signal magnetic field Hm is generated. Thus, the value of the output of the comparator COMP is brought to a high level, and the base potential of the transistor Tr2 attains a high level. Hence, the transistor Tr2 is turned on, and the collector potential thereof is brought to a low level. As a result, the logical value of the output signal OUT attains a low level.

Accordingly, the logical value of the output signal OUT is brought to the high level or to the low level in accordance with the logical value of the input signal SIG. That is, it is possible to perform signal transmission between the mutually-insulated electric circuits in a non-contact fashion.

According to the signal transmission device of the present embodiment of the invention, the signal transmission device is provided with the magnetically-biasing coil 30. Therefore, it is possible to increase magnetic resistance of each of the MR elements 21 to an external noise even when the input signal current Im is zero or substantially zero, by previously applying the predetermined biasing magnetic field Hb to each of the MR elements 21 from the magnetically-biasing coil 30. That is, it is possible to suppress malfunction of the detection circuit 20 caused by the external noise, and to improve operation stability. Further, each of the MR elements 21 exhibits the resistance values which correspond to the off-state in which the input signal current Im is zero (Im=0) and the on-state in which the predetermined input signal current Im (=$I_{ON}$) flows, respectively. Thus, each of the MR elements 21 outputs two resistance values stably without the reversing operation of reversing the direction of the input signal current Im. Therefore, it is possible to eliminate a circuit for reversing the direction of current, which is advantageous for a reduction of a size of an overall structure.

In addition thereto, the self-biasing magnetic field Hsb which is in the same direction as that of the biasing magnetic field Hb is applied to the free layer 63 by the sensing currents I1 and I2 flowing in the MR elements 21. Thus, the self-biasing magnetic field Hsb functions similarly to the biasing magnetic field Hb. That is, it is possible to reduce the biasing magnetic field Hb required for each of the MR elements 21, and to further reduce the biasing current Ib accordingly. Therefore, it is possible to reduce power consumption at the time of driving operation.

Also, the magnetically-biasing coil 30 and the MR elements 21 are connected in series, and the biasing current Ib is supplied to the MR elements 21 as the sensing currents I1 and I2. This makes it possible for the magnetically-biasing coil 30 and the MR elements 21 to share the power source Vdd2. Therefore, it is possible to attain further reduction in the power consumption at the time of the driving operation, and to attain simplification of the overall structure.

Also, the direction of the input signal magnetic field Hm applied to the free layer 63 is set in the direction opposite to the direction to which the biasing magnetic field Hb and the self-biasing magnetic field Hsb are applied. Thus, the negative output is obtained from each of the MR elements 21 in a state where the input signal current Im does not flow (i.e., the off state), whereas the positive output is obtained therefrom in a state where the input signal current Im flows (i.e., the on state). Therefore, it is possible to obtain more accurate output signals, easily in a stable fashion.

EXAMPLES

Now, Examples of the embodiment of the invention will be described in detail.

Experiment Example 1

Figure 8:
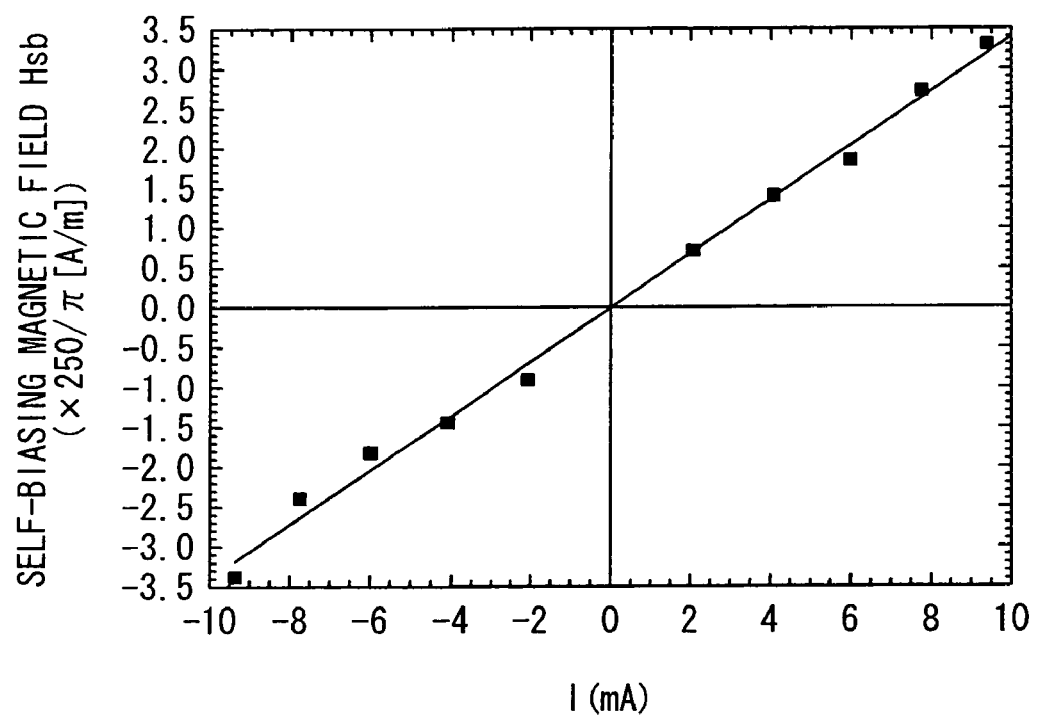
FIG. 8 is a characteristic diagram representing a relationship between a sensing current and a self-biasing magnetic field in the magnetoresistive element illustrated in FIG. 1, according to Experiment Example 1.

In the present Experiment Example 1, a relationship between the sensing current I supplied to the MR elements 21 and the self-biasing magnetic field Hsb generated thereby in the signal transmission device illustrated in the drawings including FIG. 1 was examined. FIG. 8 represents a result of the Experiment Example 1, in which a horizontal axis represents the sensing current I (in mA) supplied to the MR elements 21, whereas a vertical axis represents the self-biasing magnetic field Hsb. Also, plus and minus signs in the horizontal and the vertical axes represent the directions of the sensing current I and the directions of the self-biasing magnetic field Hsb. The pinned layer 61 was configured of a cobalt-iron alloy (CoFe), and has a thickness of 2 nm. The intermediate layer 62 was configured of copper (Cu), and has a thickness of 2 nm. The free layer 63 was configured of a nickel-iron alloy (NiFe), and has a thickness of 3 nm. A planar size (width×length) of each of the MR elements 21 was 3×129 μm. As illustrated in FIG. 8, a tendency was confirmed from the Experiment Example 1 that the self-biasing magnetic field Hsb also increased with increasing sensing current I.

Experiment Example 2

Figure 9:
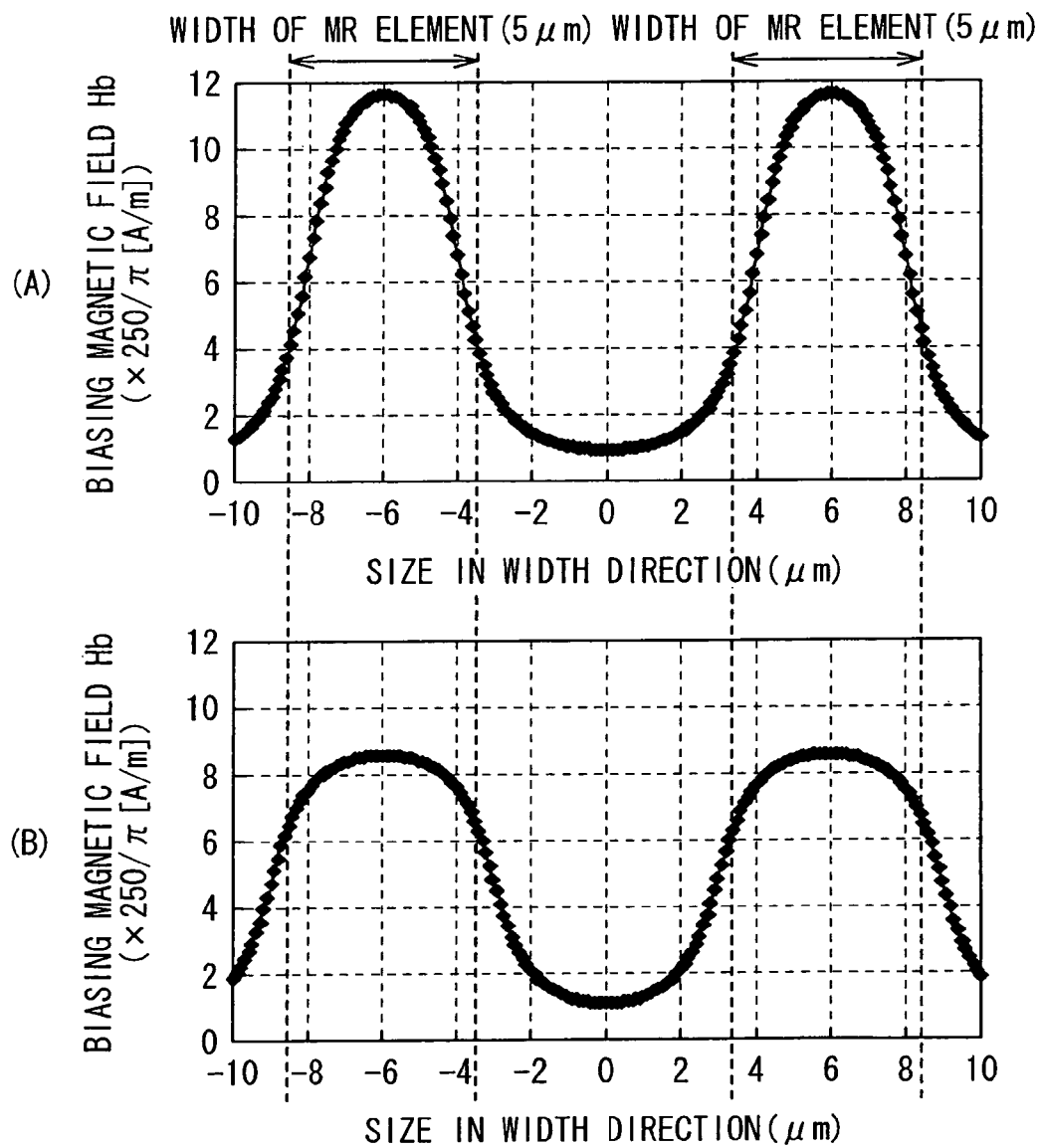
FIG. 9 is a characteristic diagram representing intensity distributions of a biasing magnetic field generated by a magnetically-biasing coil illustrated in FIG. 1, according to Experiment Example 2.

A distribution of the biasing magnetic field Hb generated by the magnetically-biasing coil 30 in the signal transmission device illustrated in the drawings including FIG. 1 was examined. More specifically, the experiment was conducted to examine an intensity distribution of the biasing magnetic field Hb generated in a width direction by two linear portions 31 of the magnetically-biasing coil 30, where the two linear portions 31 were so disposed that an interval between mutual center positions of the two linear portions 31 in the width direction was 12 μm. Part (A) and Part (B) of FIG. 9 represent results of the Experiment Example 2, in which a horizontal axis represents a size in the width direction of the magnetically-biasing coil 30, whereas a vertical axis represents the biasing magnetic field Hb. In the horizontal axis, a position 0 (zero) denotes an intermediate point of the two linear portions

31. Part (A) of FIG. 9 represents the result in which a width of the linear portions 31 was 4 μm, whereas Part (B) of FIG. 9 represents the result in which the width of the linear portions 31 was 6 μm. In each of the results, a thickness of the linear portions 31 was 1 μm, a distance between the linear portions 31 and the MR elements 21 in a thickness direction was 0.3 μm, the biasing current Ib was 9.69 mA, and a width of the MR elements 21 was 5 μm. Also, the center position of the linear portions 31 and center position of the MR elements 21 in the width direction were aligned. As represented in Part (A) and Part (B) of FIG. 9, it was found that a relatively sharp or precipitous peak was observed when the width of the linear portions 31 was narrower than that of the MR elements 21, and that a maximum value of the biasing magnetic field Hb was increased relatively high, as represented in Part (A) of FIG. 9. On the other hand, it was found that, although the maximum value of the biasing magnetic field Hb was lower than that in the result represented in Part (A) of FIG. 9, the biasing magnetic field Hb reaching the MR elements 21 was more homogenized in the width direction when the width of the linear portions 31 was wider than that of the MR elements 21, as represented in Part (B) of FIG. 9.

Experiment Example 3

Figure 10:
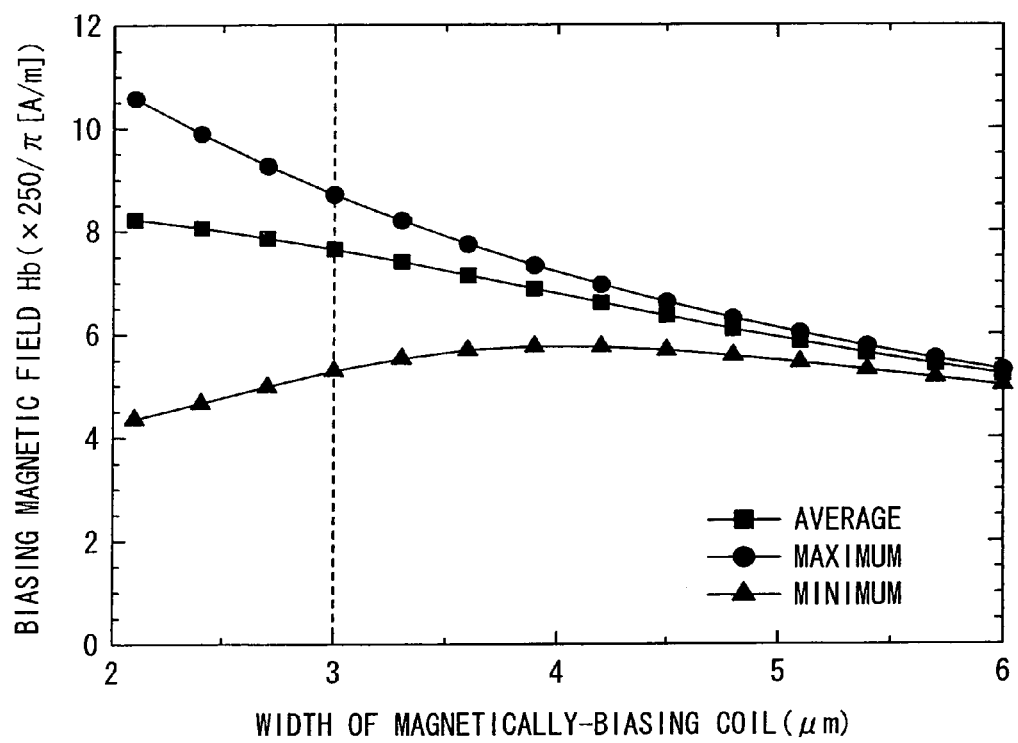
FIG. 10 is a characteristic diagram representing a relationship between a width of the magnetically-biasing coil and the biasing magnetic field reaching the magnetoresistive element in the signal transmission device illustrated in FIG. 1, according to Experiment Example 3.

A relationship between the width of the linear portions 31 of the magnetically-biasing coil 30 and the biasing magnetic field Hb reaching the MR elements 21 was examined. The conditions in the Experiment Example 3 were similar to those in the Experiment Example 2, except that the width of the MR elements 21 was 3 μm, and that the width of the linear portions 31 of the magnetically-biasing coil 30 was changed. FIG. 10 represents a result of the Experiment Example 3, in which a horizontal axis represents the width of the magnetically-biasing coil 30, whereas a vertical axis represents the biasing magnetic field Hb. Note that, since there is a difference in the magnitudes of the biasing magnetic field Hb reaching the MR elements 21 depending on the positions in the width direction thereof as represented in Part (A) and Part (B) of FIG. 9, FIG. 10 represents three numerical values including an average value (denoted by a square symbol), a maximum value (denoted by a circular symbol), and a minimum value (denoted by a triangular symbol) for respective levels.

As represented in FIG. 10, a tendency was found from the Experiment Example 3 that each of the average value, the maximum value, and the minimum value of the biasing magnetic field Hb converged to a substantially constant value with the increasing width of the linear portions 31. In particular, it was found that, when the width of the linear portions 31 was twice the width of the MR elements 21, the biasing magnetic field Hb having the substantially constant magnitude reached the MR elements 21 regardless of the width direction thereof. Meanwhile, the minimum biasing magnetic field Hb reaching the MR elements 21 did not change much even when the width of the linear portions 31 was changed, in a range represented in FIG. 10.

Experiment Example 4

Figure 11:
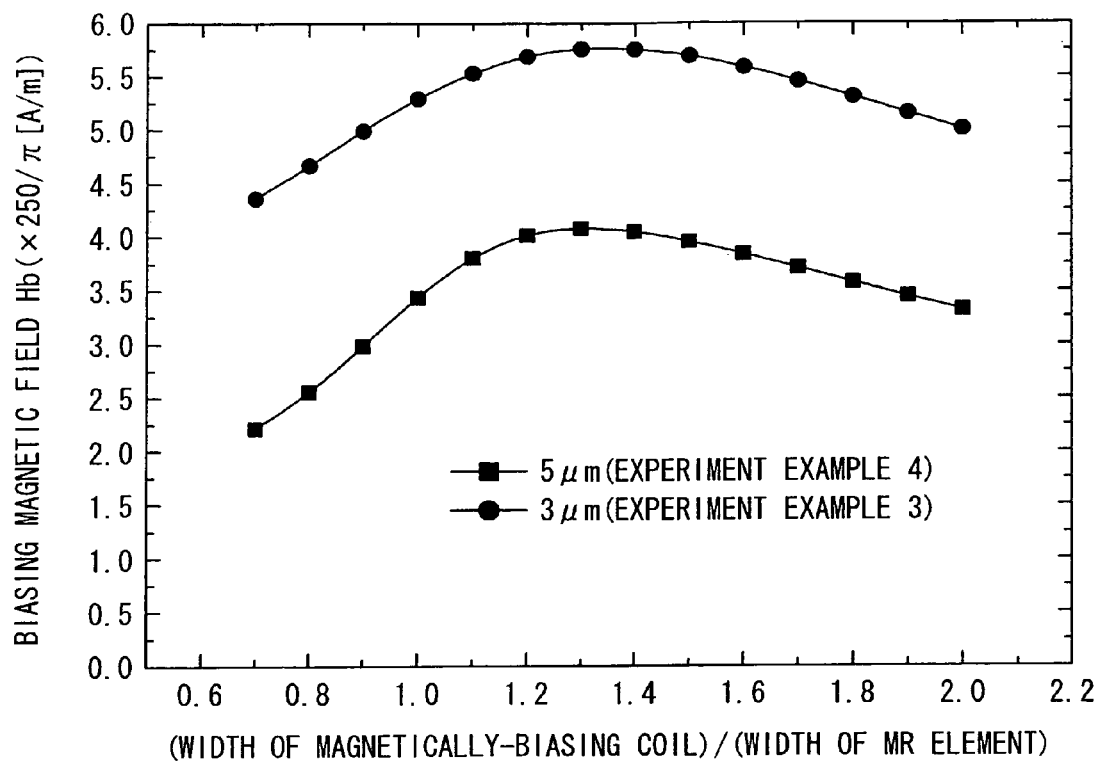
FIG. 11 is another characteristic diagram representing the relationship between the width of the magnetically-biasing coil and the biasing magnetic field reaching the magnetoresistive element in the signal transmission device illustrated in FIG. 1, according to Experiment Example 4.

A change of the biasing magnetic field Hb in accordance with a proportion of the width of the MR elements 21 to the width of the linear portions 31 of the magnetically-biasing coil 30 was examined. The conditions in the Experiment Example 4 were similar to those in the Experiment Example 3, except that the width of the MR elements 21 was 5 μm. FIG. 11 represents a result of the Experiment Example 4 together with the result in the Experiment Example 3, in which a horizontal axis represents a ratio of the width of the MR elements 21 to the width of the linear portions 31, i.e., a dimensional ratio in the width direction, whereas a vertical axis represents the minimum biasing magnetic field Hb reaching the MR elements 21. As represented in FIG. 11, it was found that the minimum biasing magnetic field Hb increased more in a range in which the dimensional ratio in the width direction is from 1.1 to 1.5.

Experiment Example 5

Figure 12:
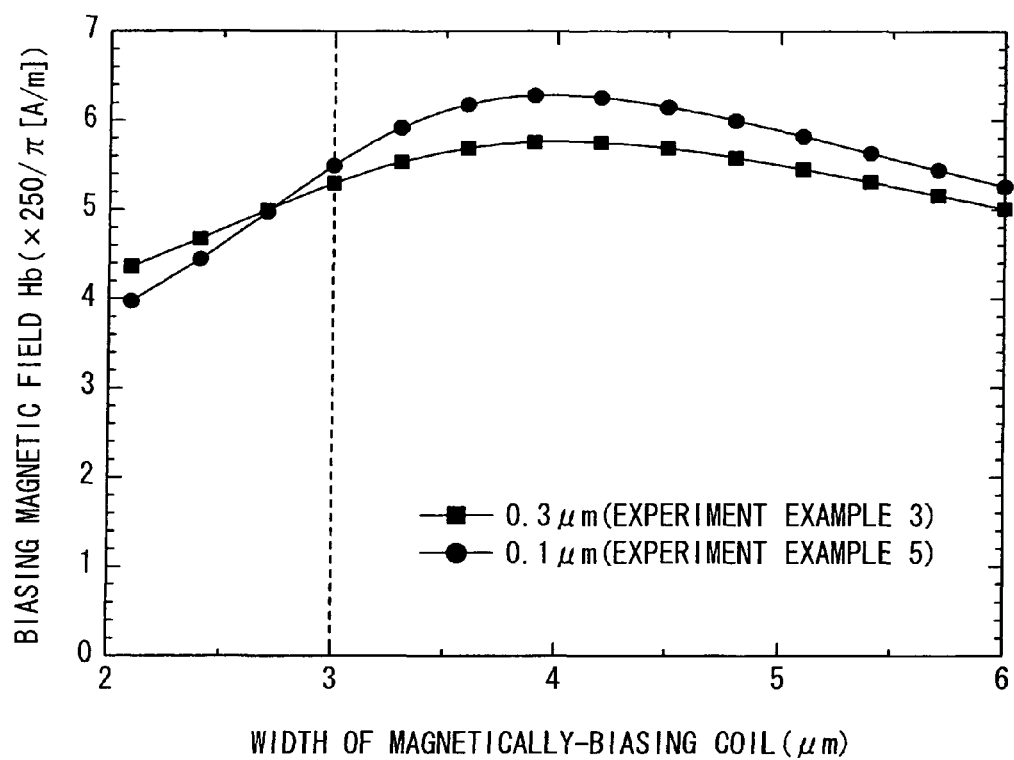
FIG. 12 is a characteristic diagram representing a relationship between a distance between the magnetically-biasing coil and the magnetoresistive element in a thickness direction thereof and the biasing magnetic field Hb in the signal transmission device illustrated in FIG. 1, according to Experiment Example 5.

An experiment was conducted as to how the distance in the thickness direction between the magnetically-biasing coil 30 and the MR elements 21 influence the biasing magnetic field Hb. The conditions in the Experiment Example 5 were similar to those in the Experiment Example 3, except that the distance in the thickness direction between the magnetically-biasing coil 30 and the MR elements 21A to 21D was 0.1 μm. FIG. 12 represents a result of the Experiment Example 5 together with the result in the Experiment Example 3, in which a horizontal axis represents the width of the linear portions 31 of the magnetically-biasing coil 30, whereas a vertical axis represents the minimum biasing magnetic field Hb reaching the MR elements 21. As represented in FIG. 12, it was found that the minimum biasing magnetic field Hb changed more largely in accordance with the width of the magnetically-biasing coil 30, with the decreasing distance in the thickness direction.

Experiment Example 6

Figure 13:
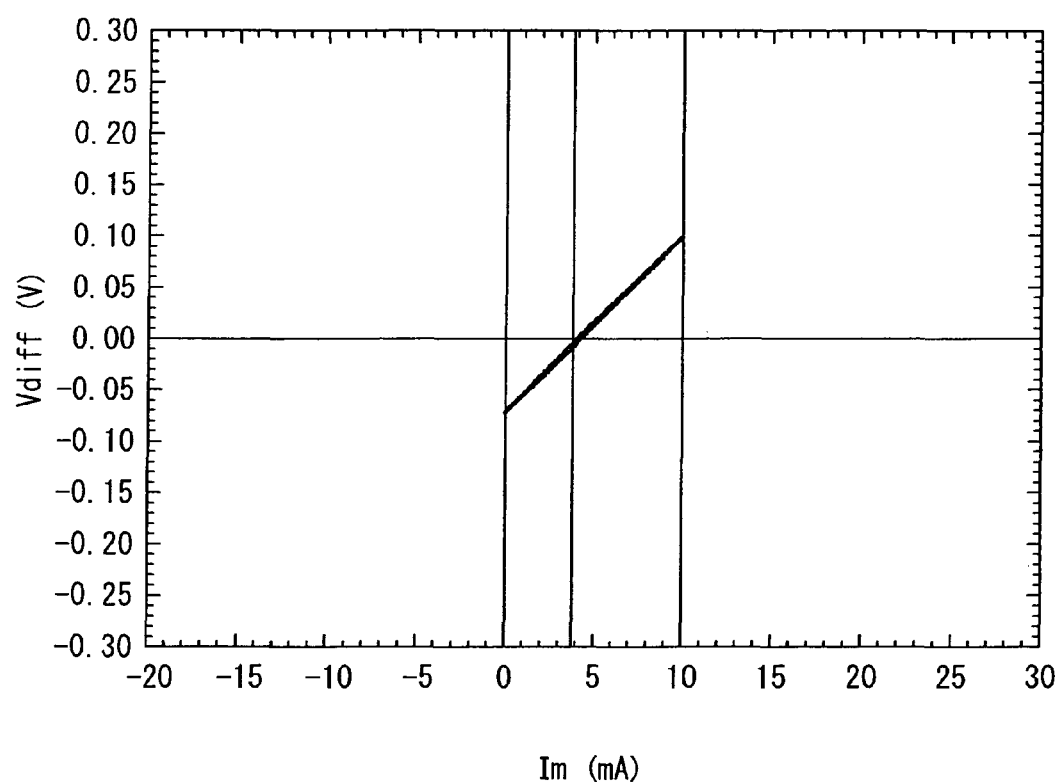
FIG. 13 is a characteristic diagram representing a relationship between an input signal current Im and a differential potential Vdiff in the signal transmission device illustrated in FIG. 1, according to Experiment Example 6.

A relationship between the input signal current Im flowing in the primary coil 10 and the differential potential Vdiff output from the detection circuit 20 in the signal transmission device illustrated in the drawings including FIG. 1 was examined. In this Experiment Example, the width of the MR elements 21 was 3 μm, the length of the MR elements was 123 μm, the width of the linear portions 31 of the magnetically-biasing coil 30 was 4 μm, and the distance in the thickness direction between the MR elements 21 and the magnetically-biasing coil 30 was 0.3 μm. Also, the potential of the power source Vdd2 was 5.76 V, and the sensing currents I1 and I2 were both 5.76 mA. A horizontal axis in FIG. 13 represents the input signal current Im, whereas a vertical axis thereof represents the differential potential Vdiff. As represented in FIG. 13, the negative differential potential Vdiff was indicated in an off-state in which the input signal current Im was 0 (zero), and the positive differential potential Vdiff was indicated in an on-state in which the input signal current Im was 10 mA. Therefore, it was confirmed that the signal transmission device according to the embodiment of the invention output binary information to the output side in accordance with the input signal current on the input side.

Figure 14:
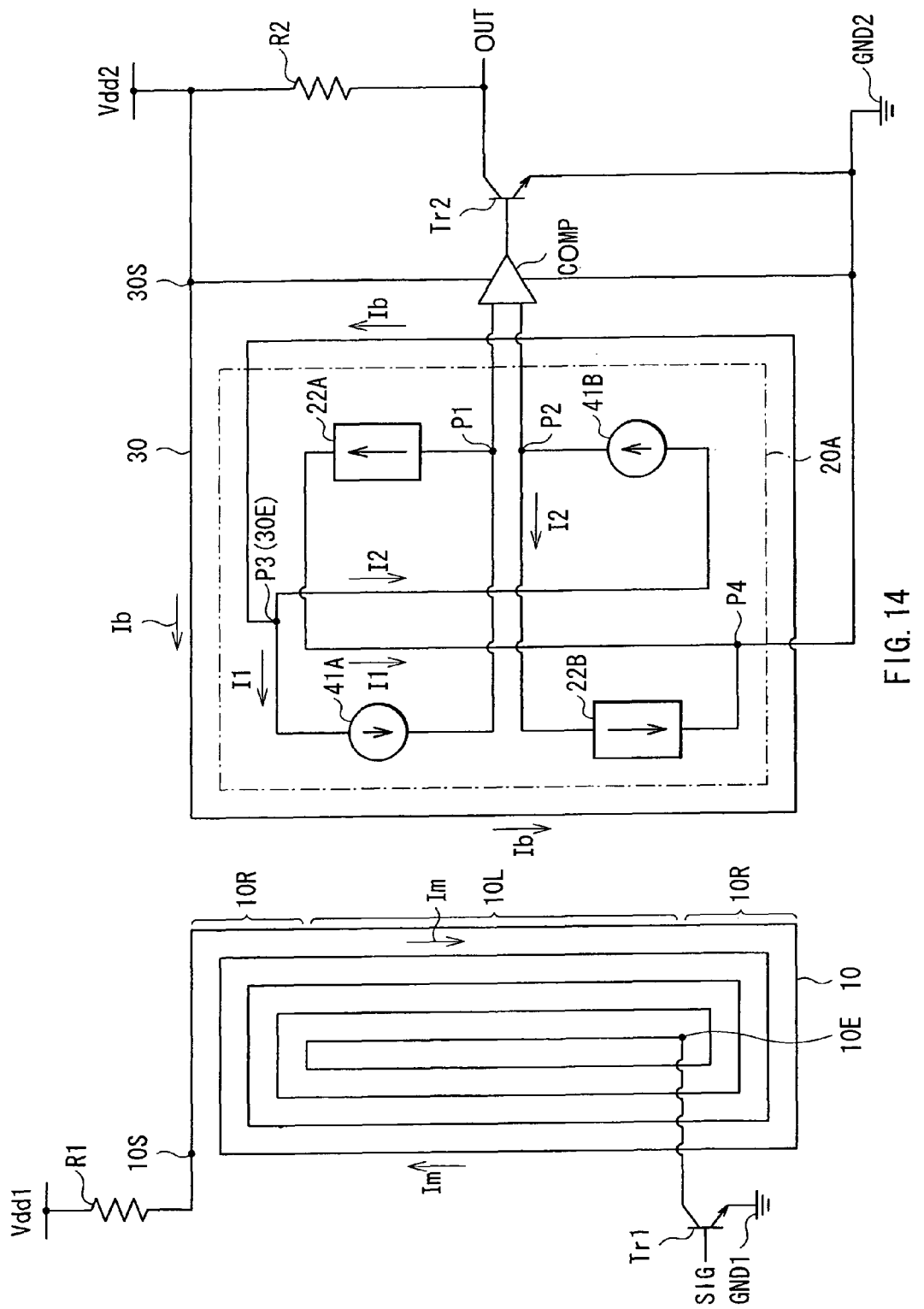
FIG. 14 is a circuit diagram of a signal transmission device according to a first Modification of the embodiment of the invention.
Figure 15:
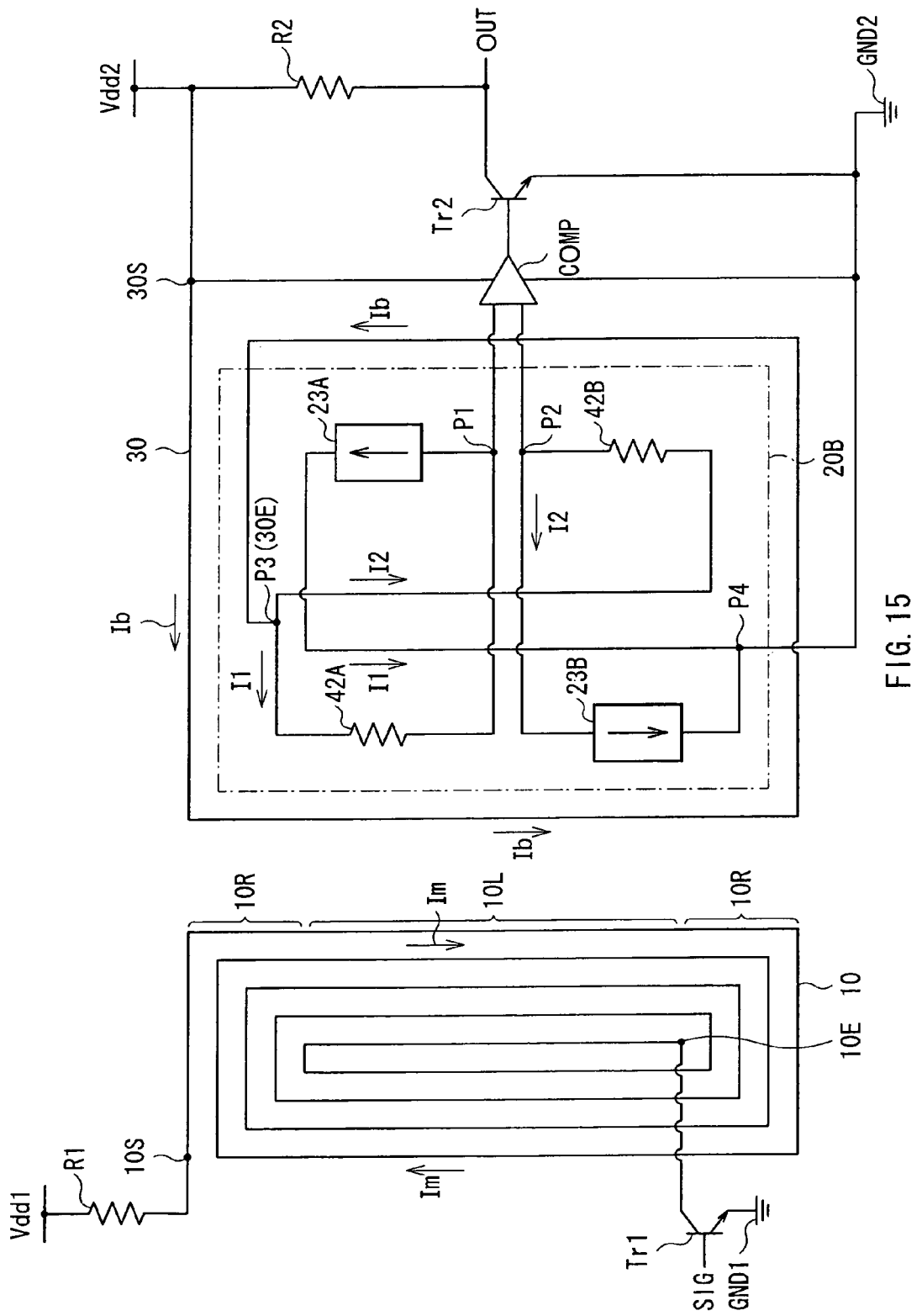
FIG. 15 is a circuit diagram of a signal transmission device according to a second Modification of the embodiment of the invention.

Although the present invention has been described in the foregoing by way of example with reference to the embodiment and Experiment Examples, the present invention is not limited thereto but may be variously modified. For example, the signal transmission device according to the embodiment and the Experiment Examples of the invention detects the input signal magnetic field Hm by using the detection circuit 20 having four MR elements 21A to 21D. However, the single MR element 21 may be disposed near the primary coil 10 and the magnetically-biasing coil 30 and a resistance change of that MR element 21 in accordance with the change of the input signal magnetic field Hm may be read, to output the binary information corresponding to the input signal current to the output side, for example. Alternatively, a detection circuit 20A in which two MR elements 22A and 22B and two constant current sources 41A and 41B are bridge-connected may be used, in accordance with a first Modification illustrated in FIG. 14. Yet alternatively, a detection circuit 20B in which two MR elements 23A and 23B and two resistors 42A and 42B are bridge-connected may be used, in accordance with a second Modification illustrated in FIG. 15.

Also, in the embodiment and the Experiment Examples described above, the primary coil 10, the MR elements 21, and the magnetically-biasing coil 30 are stacked in order on the substrate 1 side. However, positions at which the primary coil 10, the MR elements 21, and the magnetically-biasing coil 30 are disposed may be variously selected as long as the biasing magnetic field Hb and the self-biasing magnetic field Hsb are applied to the free layer 63 in the same direction.

Further, in the embodiment and the Experiment Examples described above, the direction of the sensing currents flowing in the MR elements is configured to be parallel with the direction of the biasing current Ib flowing in the magnetically-biasing conductor. However, the sensing currents I1 and I2 may be configured to flow in the opposite direction to the biasing current Ib, as illustrated in FIG. 16. Here, the positions at which the primary coil 10, the MR elements, and the magnetically-biasing coil 30 are disposed may be variously selected as well, as long as the biasing magnetic field Hb and the self-biasing magnetic field Hsb are applied to the free layer 63 in the same direction.

Moreover, in the embodiment and the Experiment Examples described above, the single strip-like pattern is utilized to configure one MR element. However, a plurality of strip-like patterns may be connected in parallel to configure one. MR element. This makes it possible for the biasing magnetic field Hb to reach the MR elements effectively, and to further increase sensitivity of the MR elements to the biasing magnetic field Hb.

In addition, in the embodiment and the Experiment Examples described above, the biasing current Ib flowing in the magnetically-biasing conductor is used as the sensing currents I1 and I2. However, an independent sensing current which is different from the biasing current Ib may be caused to flow in the detection circuit (i.e., in the MR elements).

The signal transmission device according to the embodiment of the invention may be used for isolation between input and output or blocking a noise therebetween, as a communication signal isolator, for example. Although it is not limited thereto, the use of the signal transmission device according to the embodiment of the invention for a component, which performs isolation of a signal between a primary side and a secondary side in a switching power source, can be contemplated. The signal transmission device according to the embodiment of the invention may be expected to be used as a substitute for a photocoupler or a pulse transformer which has been used generally as the currently-available communication signal isolator, since the signal transmission device according to the embodiment of the invention performs the magnetic coupling, and is advantageous in that responsiveness is superior (i.e., a delay in signal transmission is minimal), an operating temperature range is wide, and a secular change is reduced.

The present application is based on and claims priority from Japanese Patent Application No. 2009-77121, filed in the Japan Patent Office on Mar. 26, 2009, the disclosure of which is hereby incorporated by reference herein in its entirety.

Although the present invention has been described in terms of exemplary embodiments, it is not limited thereto. It should be appreciated that variations may be made in the described embodiments by persons skilled in the art without departing from the scope of the present invention as defined by the following claims. The limitations in the claims are to be interpreted broadly based on the language employed in the claims and not limited to examples described in the present specification or during the prosecution of the application, and the examples are to be construed as non-exclusive. For example, in the present disclosure, the term "preferably", "preferred" or the like is non-exclusive and means "preferably", but not limited to. The use of the terms first, second, etc. do not denote any order or importance, but rather the terms first, second, etc. are used to distinguish one element from another. Moreover, no element or component in the present disclosure is intended to be dedicated to the public regardless of whether the element or component is explicitly recited in the following claims.

What is claimed is:

1. A signal transmission device, comprising:
   an input signal conductor in which an input signal current flows and thereby generating an input signal magnetic field;
   a magnetically-biasing conductor in which a biasing current flows and thereby generating a biasing magnetic field; and
   one or more magnetoresistive elements in each of which a sensing current flows and thereby generating a self-biasing magnetic field, and each including a magnetization free layer having a magnetization direction which varies in response to the input signal magnetic field, the biasing magnetic field, and the self-biasing magnetic field,
   wherein each of the biasing magnetic field and the self-biasing magnetic field is applied to the magnetization free layer in a same direction as each other.

2. The signal transmission device according to claim 1, wherein the magnetically-biasing conductor and each of the magnetoresistive elements are connected in series to each other, and the biasing current is supplied to each of the magnetoresistive elements so as to work as the sensing current.

3. The signal transmission device according to claim 1, wherein inside the magnetization free layer, a direction of the input signal magnetic field is opposite to a direction of both the biasing magnetic field and the self-biasing magnetic field.

4. The signal transmission device according to claim 1, wherein each of the magnetoresistive elements extends along the magnetically-biasing conductor.

5. The signal transmission device according to claim 4, wherein a width of the magnetically-biasing conductor is larger than a width of each of the magnetoresistive elements.

6. The signal transmission device according to claim 4, wherein a width of the magnetically-biasing conductor is less than a width of each of the magnetoresistive elements.

7. The signal transmission device according to claim 1, wherein the magnetically-biasing conductor includes a thin-film coil wound along a film plane, and the one or more magnetoresistive elements extends along the magnetically-biasing conductor.

8. The signal transmission device according to claim 1, wherein
   each of the magnetoresistive elements has a stacked structure including the magnetization free layer, a magnetization pinned layer, and a non-magnetic intermediate layer, and
   the self-biasing magnetic field is induced by the sensing current flowing in the non-magnetic intermediate layer of each of the magnetoresistive elements.

9. The signal transmission device according to claim 1, wherein the input signal conductor, the magnetically-biasing conductor, and each of the magnetoresistive elements are so stacked as to overlap one another in a thickness direction thereof.

10. A signal transmission device, comprising:
an input signal conductor in which an input signal current flows and thereby generating an input signal magnetic field;
a magnetically-biasing conductor in which a biasing current flows and thereby generating a biasing magnetic field;
a first magnetoresistive element and a second magnetoresistive element in each of which a sensing current flows and thereby generating a self-biasing magnetic field, and each including a magnetization free layer having a magnetization direction which varies in response to the input signal magnetic field, the biasing magnetic field, and the self-biasing magnetic field, the first magnetoresistive element exhibiting a resistance change in an increasing-decreasing direction, and the second magnetoresistive element exhibiting a resistance change in another increasing-decreasing direction different from the increasing-decreasing direction of the first magnetoresistive element; and
a difference detector outputting an output signal according to a difference between a resistance value of the first magnetoresistive element and a resistance value of the second magnetoresistive element,
wherein each of the biasing magnetic field and the self-biasing magnetic field is applied to the magnetization free layer in a same direction as each other.

11. A signal transmission device, comprising:
an input signal conductor in which an input signal current flows and thereby generating an input signal magnetic field;
a magnetically-biasing conductor in which a biasing current flows and thereby generating a biasing magnetic field;
a first magnetoresistive element, a second magnetoresistive element, a third magnetoresistive element, and a fourth magnetoresistive element in each of which a sensing current flows and thereby generating a self-biasing magnetic field, and each including a magnetization free layer having a magnetization direction which varies in response to the input signal magnetic field, the biasing magnetic field, and the self-biasing magnetic field, each of the first magnetoresistive element to the fourth magnetoresistive element including a first terminal and a second terminal; and
a difference detector,
wherein the first magnetoresistive element to the fourth magnetoresistive element establish a bridge circuit, in which the first terminal of the first magnetoresistive element and the first terminal of the second magnetoresistive element are connected in a first connection point, the first terminal of the third magnetoresistive element and the first terminal of the fourth magnetoresistive element are connected in a second connection point, the second terminal of the first magnetoresistive element and the second terminal of the fourth magnetoresistive element are connected in a third connection point, and the second terminal of the second magnetoresistive element and the second terminal of the third magnetoresistive element are connected in a fourth connection point,
both a resistance value of the first magnetoresistive element and a resistance value of the third magnetoresistive element change in a same increasing-decreasing direction, in response to the input signal magnetic field, the biasing magnetic field, and the self-biasing magnetic field,
both a resistance value of the second magnetoresistive element and a resistance value of the fourth magnetoresistive element change in another increasing-decreasing direction different from the increasing-decreasing direction of the first magnetoresistive element and the third magnetoresistive element, in response to the input signal magnetic field, the biasing magnetic field, and the self-biasing magnetic field,
the difference detector detects a differential potential which appears between the first connection point and the second connection point when a voltage is applied between the third connection point and the fourth connection point, and
each of the biasing magnetic field and the self-biasing magnetic field is applied to the magnetization free layer in a same direction as each other.

* * * * *